United States Patent
Liao et al.

(10) Patent No.: US 11,038,178 B2
(45) Date of Patent: Jun. 15, 2021

(54) PROTECTIVE LAYERS IN LITHIUM-ION ELECTROCHEMICAL CELLS AND ASSOCIATED ELECTRODES AND METHODS

(71) Applicant: Sion Power Corporation, Tucson, AZ (US)

(72) Inventors: Zhaohui Liao, Tucson, AZ (US); Chariclea Scordilis-Kelley, Tucson, AZ (US); Tracy Earl Kelley, Tucson, AZ (US); Michael G. Laramie, Tucson, AZ (US); Yuriy V. Mikhaylik, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 0 days.

(21) Appl. No.: 14/848,659

(22) Filed: Sep. 9, 2015

(65) Prior Publication Data
US 2016/0072132 A1    Mar. 10, 2016

Related U.S. Application Data

(60) Provisional application No. 62/048,228, filed on Sep. 9, 2014.

(51) Int. Cl.
*H01M 4/62* (2006.01)
*H01M 4/485* (2010.01)
(Continued)

(52) U.S. Cl.
CPC .......... *H01M 4/628* (2013.01); *H01M 4/131* (2013.01); *H01M 4/1391* (2013.01);
(Continued)

(58) Field of Classification Search
CPC ...... H01M 4/628; H01M 4/131; H01M 4/391; H01M 4/485; H01M 4/505; H01M 4/525;
(Continued)

(56) References Cited

U.S. PATENT DOCUMENTS 4,321,163 A    3/1982  Wahl et al.
4,390,460 A *  6/1983  Miyauchi ................ C03C 3/097
                                                         252/519.14

(Continued)

FOREIGN PATENT DOCUMENTS

CN    102637899 A  *  8/2012
JP    S61-208750 A      9/1986
(Continued)

OTHER PUBLICATIONS

J-PlatPat machine translation of the detailed description of JP 2008-171588A (Jul. 2008).*
(Continued)

*Primary Examiner* — Gregg Cantelmo
(74) *Attorney, Agent, or Firm* — Wolf, Greenfield & Sacks, P.C.

(57) ABSTRACT

Protective layers in lithium-ion electrochemical cells, and associated electrodes and methods, are generally described. The protective layers may comprise lithium-ion-conductive inorganic ceramic materials, such as lithium oxide, lithium nitride, and/or lithium oxysulfide. The resulting lithium-ion electrochemical cells may exhibit enhanced performance, including reduced capacity fade rates and reduced self-discharge rates.

21 Claims, 21 Drawing Sheets

(51) Int. Cl.
| | |
|---|---|
| *H01M 4/58* | (2010.01) |
| *H01M 4/525* | (2010.01) |
| *H01M 4/505* | (2010.01) |
| *H01M 4/131* | (2010.01) |
| *H01M 4/1391* | (2010.01) |
| *H01M 10/0525* | (2010.01) |
| *H01M 4/04* | (2006.01) |

(52) U.S. Cl.
CPC .......... *H01M 4/485* (2013.01); *H01M 4/505* (2013.01); *H01M 4/525* (2013.01); *H01M 4/5825* (2013.01); *H01M 4/0423* (2013.01); *H01M 4/0426* (2013.01); *H01M 4/0428* (2013.01); *H01M 10/0525* (2013.01)

(58) Field of Classification Search
CPC ............. H01M 4/5825; H01M 4/4023; H01M 4/4026; H01M 4/0428; H01M 10/0525; H01M 4/1391; H01M 4/0426; H01M 4/0423; H01M 50/403; H01M 50/409; H01M 50/411; H01M 50/417; H01M 50/431; H01M 50/434; H01M 50/449; H01M 50/46; H01M 50/489; H01M 50/491
See application file for complete search history.

(56) References Cited

U.S. PATENT DOCUMENTS

| | | |
|---|---|---|
| 4,664,991 A | 5/1987 | Perichaud et al. |
| 4,739,018 A | 4/1988 | Armand et al. |
| 4,832,463 A | 5/1989 | Goldner et al. |
| 4,833,048 A | 5/1989 | Dejonghe et al. |
| 4,865,930 A | 9/1989 | Kindler et al. |
| 4,917,974 A | 4/1990 | Dejonghe et al. |
| 4,954,371 A | 9/1990 | Yializis |
| 5,162,175 A | 11/1992 | Visco et al. |
| 5,194,341 A | 3/1993 | Bagley et al. |
| 5,314,765 A | 5/1994 | Bates et al. |
| 5,324,599 A | 6/1994 | Oyama et al. |
| 5,366,829 A | 11/1994 | Saidi |
| 5,387,479 A | 2/1995 | Koksbang |
| 5,415,954 A | 5/1995 | Gauthier |
| 5,434,021 A | 7/1995 | Fauteux et al. |
| 5,441,831 A | 8/1995 | Okamoto et al. |
| 5,460,905 A | 10/1995 | Skotheim |
| 5,462,566 A | 10/1995 | Skotheim |
| 5,487,959 A | 1/1996 | Koksbang et al. |
| 5,516,598 A | 5/1996 | Visco et al. |
| 5,529,860 A | 6/1996 | Skotheim et al. |
| 5,538,812 A | 6/1996 | Lee et al. |
| 5,532,083 A | 7/1996 | McCullough |
| 5,569,520 A | 10/1996 | Bates |
| 5,601,947 A | 2/1997 | Skotheim et al. |
| 5,648,187 A | 7/1997 | Skothiem et al. |
| 5,681,615 A | 10/1997 | Affinito et al. |
| 5,690,702 A | 11/1997 | Skotheim et al. |
| 5,716,736 A | 2/1998 | Zhang et al. |
| 5,723,230 A | 3/1998 | Naoi et al. |
| 5,731,104 A | 3/1998 | Ventura et al. |
| 5,783,330 A | 7/1998 | Naoi et al. |
| 5,792,575 A | 8/1998 | Naoi et al. |
| 5,824,434 A | 10/1998 | Kawakami et al. |
| 5,834,137 A | 11/1998 | Zhang et al. |
| 5,882,819 A | 3/1999 | Naoi et al. |
| 5,919,587 A | 7/1999 | Mukherjee et al. |
| 5,961,672 A | 10/1999 | Skotheim et al. |
| 6,025,094 A | 2/2000 | Visco et al. |
| 6,066,417 A | 5/2000 | Cho et al. |
| 6,117,590 A | 9/2000 | Skotheim et al. |
| 6,153,337 A | 11/2000 | Carlson et al. |
| 6,156,395 A | 12/2000 | Zhang et al. |
| 6,183,901 B1 | 2/2001 | Ying et al. |
| 6,201,100 B1 | 3/2001 | Gorkovenko et al. |
| 6,202,591 B1 | 3/2001 | Witzman et al. |
| 6,203,947 B1 | 3/2001 | Peled et al. |
| 6,225,002 B1 | 5/2001 | Nimon et al. |
| 6,268,695 B1 | 7/2001 | Affinito |
| 6,276,355 B1 | 8/2001 | Zhang et al. |
| 6,277,514 B1 | 8/2001 | Ying et al. |
| 6,284,412 B1 | 9/2001 | Minakata et al. |
| 6,306,545 B1 | 10/2001 | Carlson et al. |
| 6,328,770 B1 | 12/2001 | Gozdz |
| 6,395,423 B1 | 5/2002 | Kawakami et al. |
| 6,413,285 B1 | 7/2002 | Chu et al. |
| 6,432,586 B1 * | 8/2002 | Zhang .................. H01M 2/164 429/251 |
| 6,508,921 B1 | 1/2003 | Mu et al. |
| 6,517,968 B2 | 2/2003 | Johnson et al. |
| 6,570,325 B2 | 5/2003 | Graff et al. |
| 6,770,187 B1 | 8/2004 | Putter et al. |
| 6,797,428 B1 | 9/2004 | Skotheim et al. |
| 6,835,493 B2 | 12/2004 | Zhang et al. |
| 6,849,702 B2 | 2/2005 | Callahan et al. |
| 6,852,139 B2 | 2/2005 | Zhang et al. |
| 6,886,240 B2 | 5/2005 | Zhang et al. |
| 7,175,937 B2 * | 2/2007 | Cho .................. H01M 10/052 429/126 |
| 7,204,862 B1 | 4/2007 | Zhang et al. |
| 7,247,408 B2 | 7/2007 | Skotheim et al. |
| 7,553,590 B2 | 6/2009 | Mikhaylik |
| 7,771,870 B2 | 8/2010 | Affinito et al. |
| 7,785,730 B2 | 8/2010 | Affinito et al. |
| 8,076,024 B2 | 12/2011 | Affinito et al. |
| 8,105,717 B2 | 1/2012 | Skotheim et al. |
| 8,197,971 B2 | 6/2012 | Skotheim et al. |
| 8,338,034 B2 | 12/2012 | Affinito et al. |
| 8,415,054 B2 | 4/2013 | Skotheim et al. |
| 8,597,815 B2 * | 12/2013 | Takahashi ............... H01M 4/62 429/129 |
| 8,603,680 B2 | 12/2013 | Affinito et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,771,879 B2 | 7/2014 | Gordon et al. |
| 9,040,201 B2 | 5/2015 | Affinito et al. |
| 9,065,149 B2 | 6/2015 | Skotheim et al. |
| 2001/0041294 A1 | 11/2001 | Chu et al. |
| 2002/0034688 A1 | 3/2002 | Chu et al. |
| 2002/0071989 A1 | 6/2002 | Verma |
| 2002/0092155 A1 | 7/2002 | Carlson et al. |
| 2002/0114993 A1 | 8/2002 | Miyaki et al. |
| 2003/0129497 A1 | 7/2003 | Yamamoto et al. |
| 2003/0224234 A1 | 12/2003 | Steele et al. |
| 2004/0175621 A1 | 9/2004 | Iriyama et al. |
| 2004/0197641 A1 | 10/2004 | Visco et al. |
| 2005/0051763 A1 | 3/2005 | Affinito et al. |
| 2005/0084758 A1 | 4/2005 | Yamamoto et al. |
| 2005/0089757 A1 | 4/2005 | Bannai et al. |
| 2005/0100793 A1 | 5/2005 | Jonghe et al. |
| 2005/0118507 A1 | 6/2005 | Guterman et al. |
| 2005/0147888 A1 | 7/2005 | Yamamoto et al. |
| 2005/0186469 A1 | 8/2005 | De Jonghe et al. |
| 2005/0208353 A1 | 9/2005 | Johnson |
| 2006/0222954 A1 | 10/2006 | Skotheim |
| 2006/0238203 A1 | 10/2006 | Kelley et al. |
| 2007/0117007 A1 | 5/2007 | Visco et al. |
| 2007/0172739 A1 | 7/2007 | Visco |
| 2007/0212583 A1 | 9/2007 | Johnson |
| 2007/0221265 A1 | 9/2007 | Affinito et al. |
| 2007/0224502 A1 | 9/2007 | Affinito et al. |
| 2008/0014501 A1 | 1/2008 | Skotheim et al. |
| 2008/0057397 A1 | 3/2008 | Skotheim et al. |
| 2008/0070087 A1 | 3/2008 | Johnson |
| 2008/0187663 A1 | 8/2008 | Affinito |
| 2008/0213672 A1 | 9/2008 | Skotheim et al. |
| 2008/0318128 A1 | 12/2008 | Simoneau et al. |
| 2009/0035646 A1 | 2/2009 | Mikhaylik et al. |
| 2009/0068563 A1 * | 3/2009 | Kanda .................. H01M 4/13 429/306 |
| 2009/0200986 A1 | 8/2009 | Kopera et al. |

(56) References Cited

U.S. PATENT DOCUMENTS

| | | | |
|---|---|---|---|
| 2009/0246613 A1* | 10/2009 | Park | H01M 2/16 429/145 |
| 2010/0035128 A1 | 2/2010 | Scordilis-Kelley et al. | |
| 2010/0104948 A1 | 4/2010 | Skotheim et al. | |
| 2010/0129699 A1 | 5/2010 | Mikhaylik et al. | |
| 2010/0239914 A1 | 9/2010 | Mikhaylik et al. | |
| 2010/0291442 A1 | 11/2010 | Wang et al. | |
| 2010/0294049 A1 | 11/2010 | Kelley et al. | |
| 2010/0327811 A1 | 12/2010 | Affinito et al. | |
| 2011/0006738 A1 | 1/2011 | Mikhaylik et al. | |
| 2011/0008531 A1 | 1/2011 | Mikhaylik et al. | |
| 2011/0014524 A1 | 1/2011 | Skotheim et al. | |
| 2011/0045348 A1* | 2/2011 | Kubo | H01M 10/052 429/209 |
| 2011/0059361 A1 | 3/2011 | Wilkening et al. | |
| 2011/0068001 A1 | 3/2011 | Affinito et al. | |
| 2011/0070491 A1 | 3/2011 | Campbell et al. | |
| 2011/0070494 A1 | 3/2011 | Campbell et al. | |
| 2011/0076560 A1 | 3/2011 | Scordilis-Kelley et al. | |
| 2011/0159376 A1 | 6/2011 | Skotheim et al. | |
| 2011/0165471 A9 | 7/2011 | Skotheim et al. | |
| 2011/0177398 A1 | 7/2011 | Affinito et al. | |
| 2011/0200868 A1 | 8/2011 | Klaassen | |
| 2011/0206992 A1 | 8/2011 | Campbell et al. | |
| 2011/0239446 A1* | 10/2011 | Morishima | H01M 4/0404 29/623.5 |
| 2012/0048729 A1 | 3/2012 | Mikhaylik et al. | |
| 2012/0070746 A1 | 3/2012 | Mikhaylik et al. | |
| 2012/0276449 A1 | 11/2012 | Skotheim et al. | |
| 2012/0276459 A1 | 11/2012 | Im et al. | |
| 2013/0017441 A1* | 1/2013 | Affinito | H01M 2/1673 429/211 |
| 2013/0095380 A1 | 4/2013 | Affinito et al. | |
| 2013/0143096 A1 | 6/2013 | Affinito et al. | |
| 2013/0252103 A1 | 9/2013 | Mikhaylik | |
| 2014/0023933 A1* | 1/2014 | Chiga | H01M 4/13 429/319 |
| 2014/0193713 A1 | 7/2014 | Kumaresan et al. | |
| 2014/0193723 A1 | 7/2014 | Kumaresan et al. | |
| 2014/0227606 A1 | 8/2014 | Suzuki et al. | |
| 2014/0272594 A1 | 9/2014 | Sempere et al. | |
| 2014/0272597 A1 | 9/2014 | Mikhaylik et al. | |
| 2015/0044517 A1 | 2/2015 | Mikhaylik et al. | |
| 2015/0086837 A1 | 3/2015 | Laramie et al. | |
| 2015/0236322 A1 | 8/2015 | Laramie et al. | |
| 2016/0204408 A1* | 7/2016 | Herle | H01M 4/661 429/143 |

FOREIGN PATENT DOCUMENTS

| | | | |
|---|---|---|---|
| JP | 63-126156 | | 5/1988 |
| JP | 4-028172 | | 4/1992 |
| JP | 6-030246 | | 2/1994 |
| JP | H06-251764 A | | 9/1994 |
| JP | 09-279357 | | 10/1997 |
| JP | 2002-151055 A | | 5/2002 |
| JP | 2002-373643 A | | 12/2002 |
| JP | 2004-087251 A | | 3/2004 |
| JP | 2004362781 A | * | 12/2004 |
| JP | 2008-171588 A | | 7/2008 |
| JP | 2008262768 A | * | 10/2008 |
| JP | 2010056027 A | * | 3/2010 |
| KR | 20020085422 A | | 11/2002 |
| WO | WO 97/044840 | | 11/1997 |
| WO | WO 99/19931 A1 | | 4/1999 |
| WO | WO 99/033125 | | 7/1999 |
| WO | WO 99/57770 A1 | | 11/1999 |
| WO | WO 01/33651 A1 | | 5/2001 |
| WO | WO 01/39302 | | 5/2001 |
| WO | WO 01/39303 | | 5/2001 |
| WO | WO 01/97304 | | 12/2001 |
| WO | WO 02/071989 A1 | | 9/2002 |
| WO | WO 2004/036669 A2 | | 4/2004 |
| WO | WO 2005/038953 | | 4/2005 |
| WO | WO-2012132934 A1 | * | 10/2012 ............ H01M 4/13 |

OTHER PUBLICATIONS

J-PlatPat machine translation of the detailed description of JP 200-056027A. (Year: 2010).*

Zhao et al. "A solid-state electrolyte lithium phosphorus oxynitride film prepared by pulsed laser deposition"; Thin Solid Films 415 (2002), pp. 108-113. (Year: 2002).*

International Search Report and Written Opinion for Application No. PCT/US2015/049155 dated Dec. 21, 2015.

Affinito et al., A New Class of Ultra-Barrier Materials. Society of Vacuum Coaters. 47th Annual Technical Conference Proceedings. 2004. ISSN 0737-5921.

Affinito et al., High Rate Process for Deposition of Plasma Polymerized Films from High Molecular Weight/Low Vapor Pressure Liquid or Solid Monomer Precursor. 2nd International Symposium on Plasma Polymerization/Deposition: Fundamental and Applied Aspects. May 1999.

Affinito, J., et al., High rate vacuum deposition of polymer electrolytes. J. Vac. Sci. Technol. A. 1996;14(3):733-8.

Alamgir et al., Room Temperature Polymer Electrolytes. Lithium Batteries, New Materials, Developments and Perspectives, Chapter 3, pp. 93-136, Elsevier, Amsterdam (1994).

Brunauer et al., Adsorption of Gases in Multimolecular Layers. Journal of the American Chemical Society. Feb. 1938;60:309-19.

Dominey, Current State of the Art on Lithium Battery Electrolytes. Lithium Batteries, New Materials, Developments and Perspectives, Chapter 4, pp. 137-165, Elsevier, Amsterdam (1994).

Graff et al., Mechanisms of vapor permeation through multilayer barrier films: Lag time versus equilibrium permeation, Journal of Applied Physics. Aug. 2004;96(4):1840-9.

Thornton, Influence of apparatus geometry and deposition conditions on the structure and topography of thick sputtered coatings. J. Vac. Sci. Technol. 1974;11(4):666-70.

Zhuang et al., The Reaction of lithium with carbon dioxide studied by photoelectron spectroscopy. Surface Science. 1998;418:139-49.

Arora et al., Capacity Fade Mechanisms and Side Reaction in Lithium-Ion Batteries. J. Electrochem. Soc. Oct. 1998;145(10):3647-67.

Aurbach et al., A short review of failure mechanisms of lithium metal and lithiated graphite anodes in liquid electrolyte solutions. Solid State Ionics. Jun. 2, 2002;148:405-16. Epub Mar. 15, 2002.

Petibon et al., Comparative Study of Vinyl Ethylene Carbonate (VEC) and Vinylene Carbonate (VC) in $LiCoO_2$/Graphite Pouch Cells Using High Precision Coulometry and Electrochemical Impedance Spectroscopy Measurements on Symmetric Cells. J. Electrochem. Soc. 2014;161(1):A66-74. Epub Nov. 7, 2013.

Shim et al., Electrochemical analysis for cycle performance and capacity fading of a lithium-ion battery cycled at elevated temperature. Journal of Power Sources. 2002;112:222-30. Epub Sep. 11, 2002.

Ziv et al., Investigation of the Reasons for Capacity Fading in Li-Ion Battery Cells. J. Electrochem. Soc. 2014;161(10):A1672-80. Epub Jul. 23, 2014.

Extended European Search Report dated Mar. 8, 2018 for Application No. 15839243.1.

* cited by examiner

PROTECTIVE LAYERS IN LITHIUM-ION ELECTROCHEMICAL CELLS AND ASSOCIATED ELECTRODES AND METHODS

RELATED APPLICATIONS

This application claims priority under 35 U.S.C. § 119(e) to U.S. Provisional Application Ser. No. 62/048,228, entitled "Protective Layers in Lithium-Ion Electrochemical Cells and Associated Electrodes and Methods," filed Sep. 9, 2014, which is incorporated herein by reference in its entirety for all purposes.

TECHNICAL FIELD

Protective layers in lithium-ion electrochemical cells, and associated electrodes and methods, are generally described.

BACKGROUND

Lithium-ion electrochemical cells (also sometimes referred to as lithium-ion batteries) are a family of electrochemical cells in which lithium ions are transported between an anode and a cathode during charge and discharge. Typical lithium-ion electrochemical cells include a lithium intercalation compound-based cathode paired with a carbon-comprising anode such as graphite. There has been considerable interest in recent years in developing high-energy-density lithium-ion electrochemical cells, especially in consumer electronics, vehicle, and aerospace applications. However, the performance of lithium-ion electrochemical cells can be inhibited due to adverse interactions between battery components such as the electrodes and the electrolyte.

Accordingly, improved lithium-ion electrochemical cells are desirable.

SUMMARY

Protective layers in lithium-ion electrochemical cells, and associated electrodes and methods, are generally described. The subject matter of the present invention involves, in some cases, interrelated products, alternative solutions to a particular problem, and/or a plurality of different uses of one or more systems and/or articles.

In one aspect, a lithium intercalation electrode is described. According to some embodiments, the lithium intercalation electrode comprises a layer comprising an electroactive material (i.e., an electroactive layer), wherein the electroactive material is a lithium intercalation compound. The electrode also includes an inorganic lithium-ion-conductive layer disposed on a surface of the layer comprising the electroactive material.

According to some embodiments, the lithium intercalation electrode comprises a layer comprising an electroactive material. In certain embodiments, the electroactive material is a lithium intercalation compound. In some embodiments, an inorganic lithium-ion-conductive layer is integrated with the layer comprising the electroactive material. The lithium-ion-conductive layer has a thickness of at least 0.1 microns.

In another aspect, a method of fabricating a lithium intercalation electrode is described. In some embodiments, the method comprises depositing an inorganic lithium-ion-conductive layer on a layer comprising an electroactive material. In certain cases, the electroactive material is a lithium intercalation compound.

In another aspect, an electrochemical cell is provided. In some embodiments, the electrochemical cell comprises a first, lithium intercalation electrode including a layer comprising an electroactive material, and an inorganic lithium-ion-conductive layer integrated with the layer comprising the electro active material. The inorganic lithium-ion-conductive layer may comprise lithium. The electrochemical cell also includes a second electrode and an electrolyte. At least a portion of the first lithium intercalation electrode is in contact with the electrolyte.

In another aspect, a method is provided. The method comprises cycling an electrochemical cell comprising a first, lithium intercalation electrode including a layer comprising an electroactive material, and an inorganic lithium-ion-conductive layer integrated with the layer comprising the electroactive material. The inorganic lithium-ion-conductive layer may comprise lithium. The electrochemical cell also includes a second electrode. The method involves substantially inhibiting a species decomposed from the first, lithium intercalation electrode, or a species decomposed from the electrolyte, from residing at the second electrode.

In another aspect, an electrode is described. In some embodiments, the electrode comprises a layer comprising an electroactive material. In certain cases, at least a portion of the electroactive material is in direct contact with an electrolyte and/or the layer is porous and/or the layer comprises a plurality of particles of the electroactive material. In some embodiments, the first electrode comprises an inorganic lithium-ion-conductive layer integrated with the layer comprising the electroactive material.

In another aspect, a method of fabricating an electrode is described. In some embodiments, the method comprises depositing an inorganic lithium-ion-conductive layer on a layer comprising an electroactive material. In certain cases, the layer comprising the electroactive material is porous and/or comprises a plurality of particles. In some embodiments, the inorganic lithium-ion-conductive layer comprises lithium.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

Figure 4:
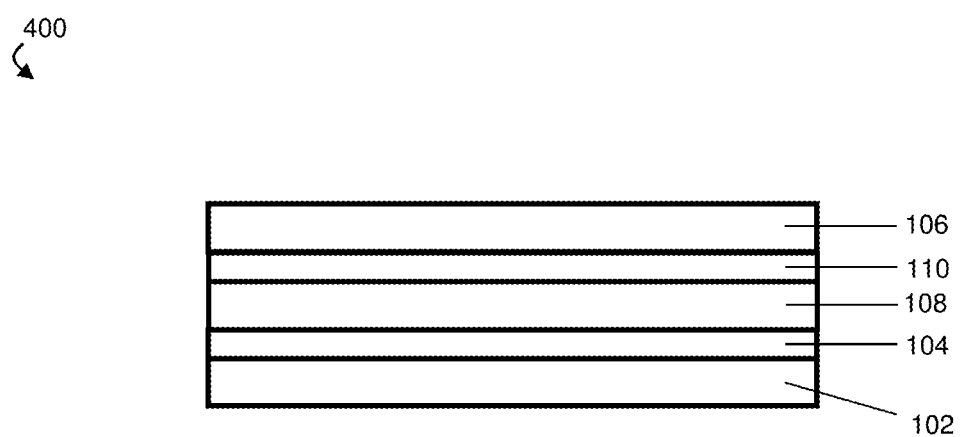
Figure 5:
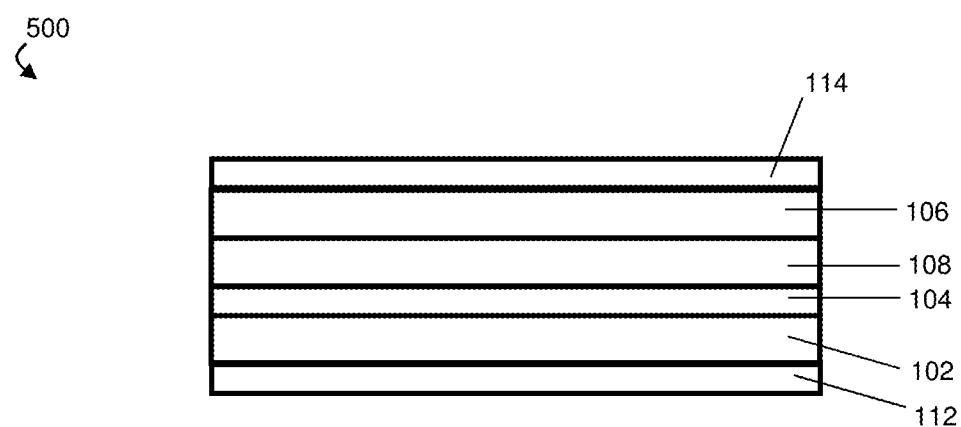
Figure 6:
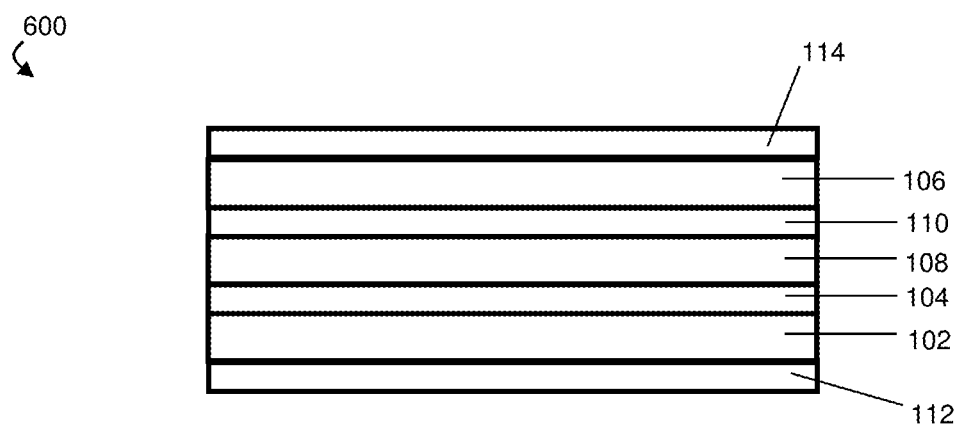
Figure 7:
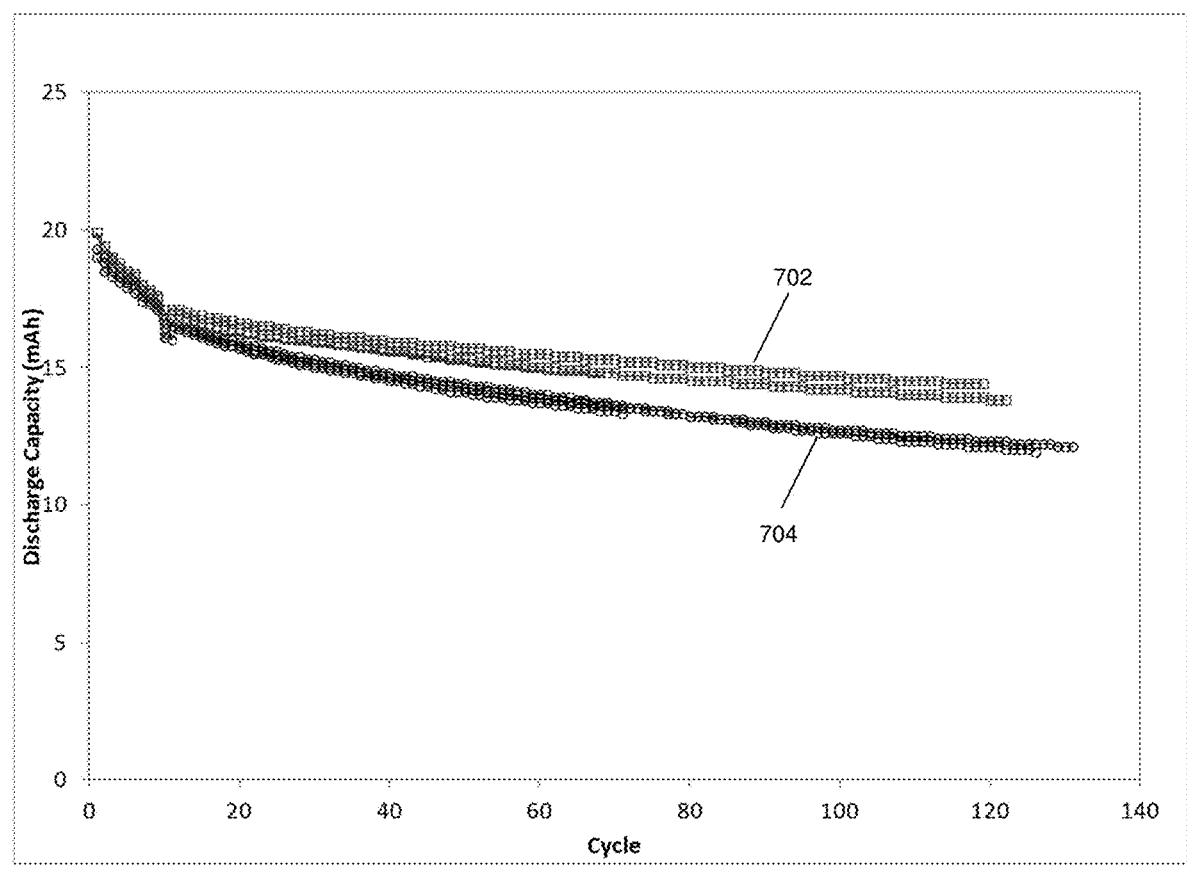
Figure 8A:
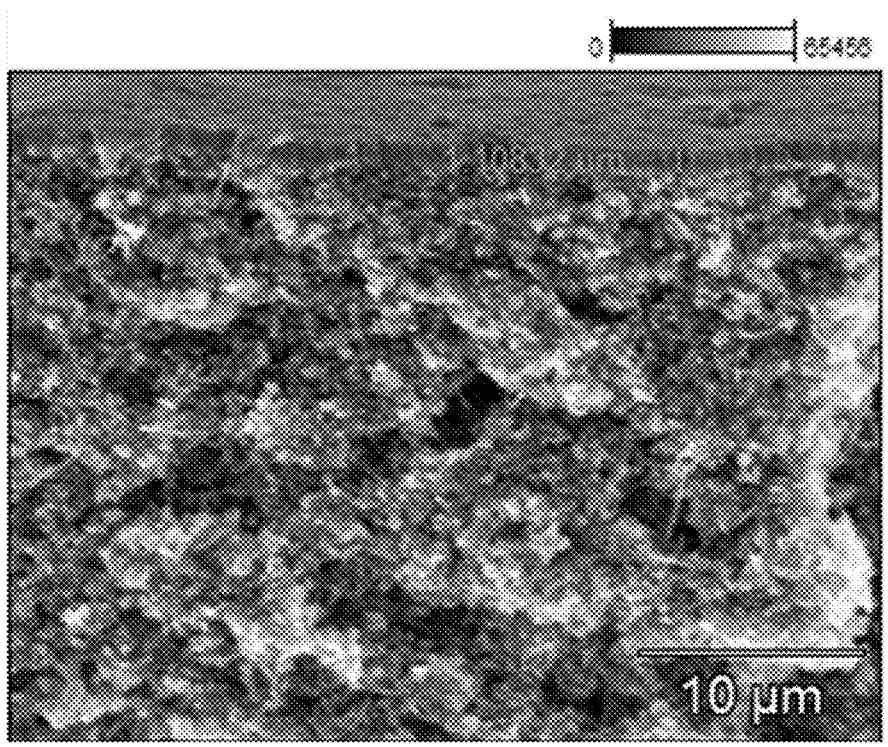
Figure 8B:
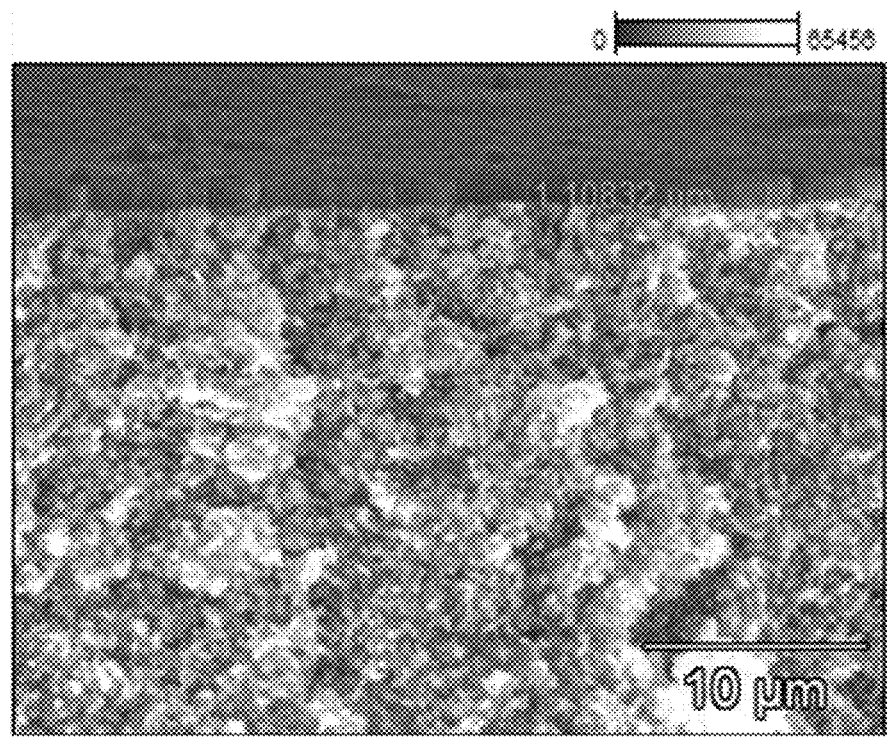
Figure 9A:
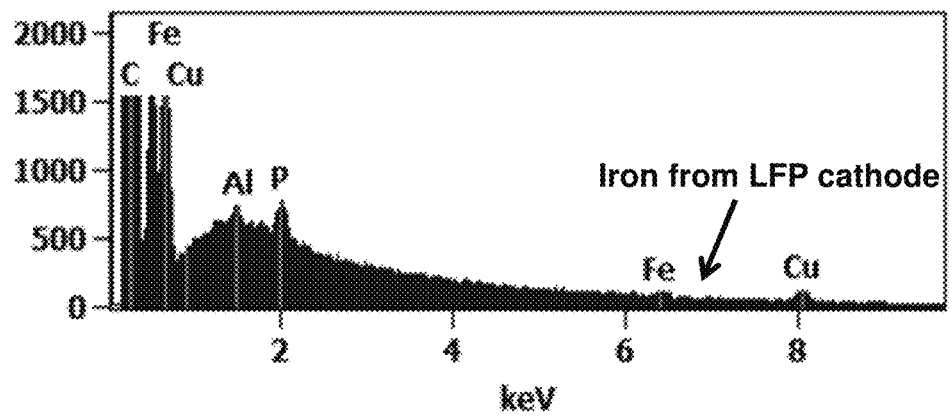
Figure 9B:
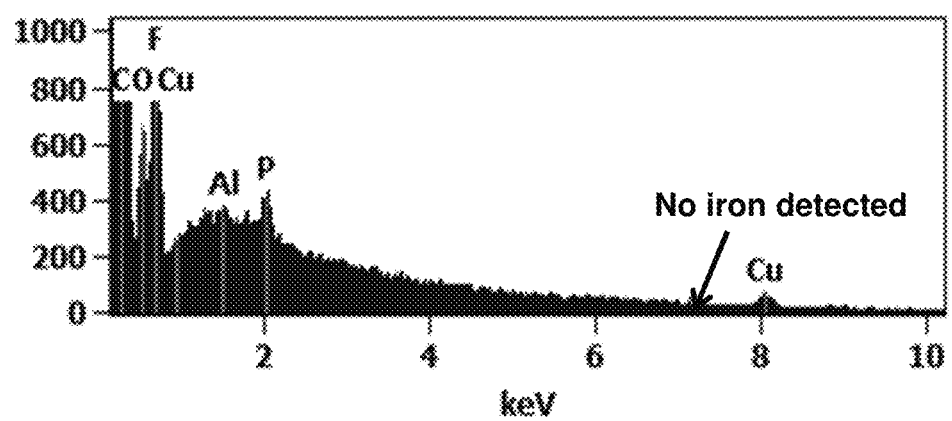
Figure 10:
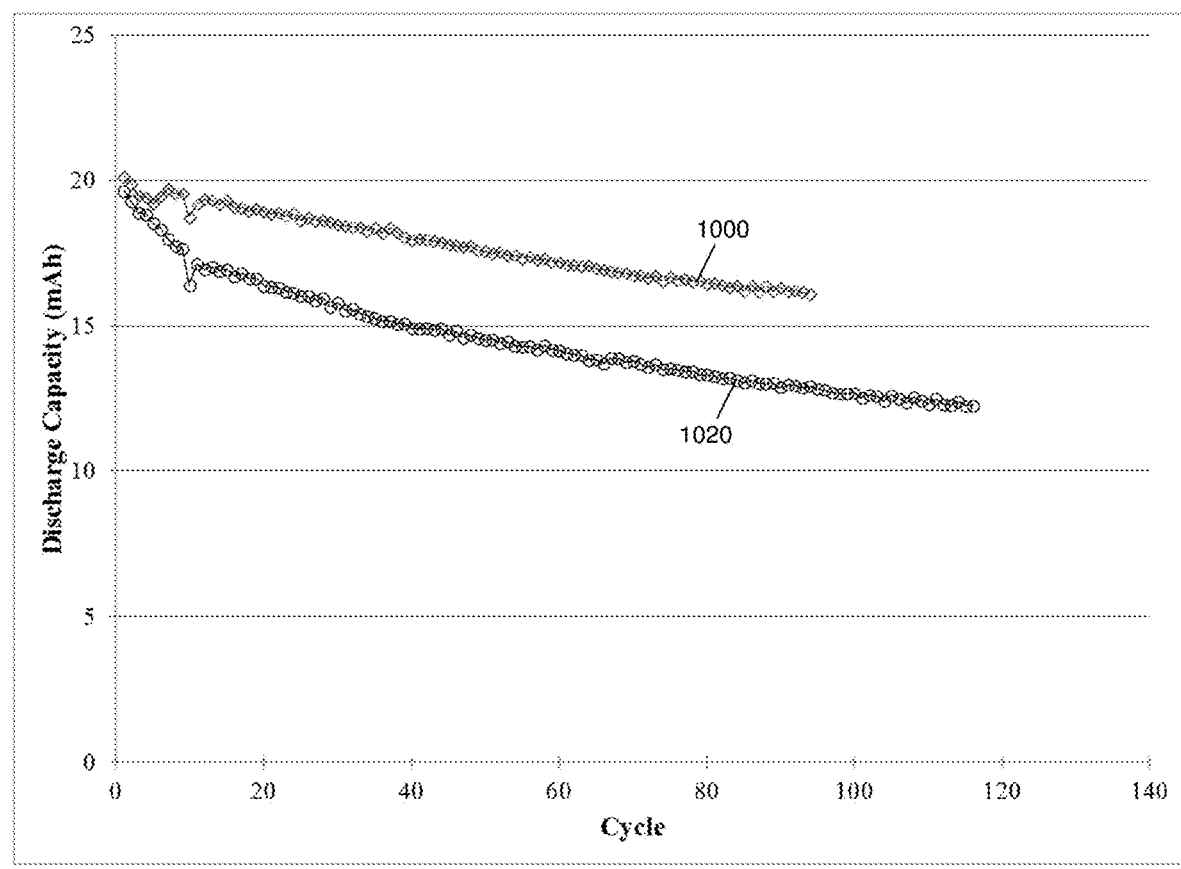

a lithium-ion-conductive layer integrated with a second, different electroactive-material-containing layer;

FIG. 4 is a cross-sectional schematic illustration of an electrochemical cell comprising a first lithium-ion-conductive layer integrated with a first electroactive-material-containing layer and a second lithium-ion-conductive layer integrated with a second electroactive-material-containing layer, according to some embodiments;

FIG. 5 is a cross-sectional schematic illustration of an electrochemical cell comprising first and second electroactive-material-containing layers, a lithium-ion-conductive layer, a separator, and first and second substrates, according to some embodiments;

FIG. 6 is a cross-sectional schematic illustration of an electrochemical cell comprising first and second electroactive-material-containing layers, first and second lithium-ion-conductive layers, a separator, and first and second substrates, according to some embodiments;

FIG. 7 is an exemplary plot of discharge capacity as a function of cycle for electrochemical cells comprising a graphite anode and a lithium oxide-coated lithium iron phosphate (LFP) cathode, according to some embodiments;

FIGS. 8A-8B are scanning electron microscope (SEM) images of a cross-sectional view of a lithium oxide-coated LFP cathode, according to some embodiments: (A) before cycling; and (B) after 70 cycles (initial 5 cycles at room temperature, then at 50° C.);

FIGS. 9A-B are energy-dispersive spectroscopy (EDS) spectra of a graphite anode after 70 cycles in: (A) a graphite/LFP control cell; and (B) a graphite/$Li_2O$-coated LFP cell;

FIG. 10 is an exemplary plot of discharge capacity as a function of cycle for electrochemical cells comprising a graphite anode and an LFP cathode with a 0.5 μm-thick lithium oxysulfide coating, according to some embodiments; where the electrochemical cells were cycled at room temperature for the first 5 cycles, then cycled at 50° C.

Figure 11:
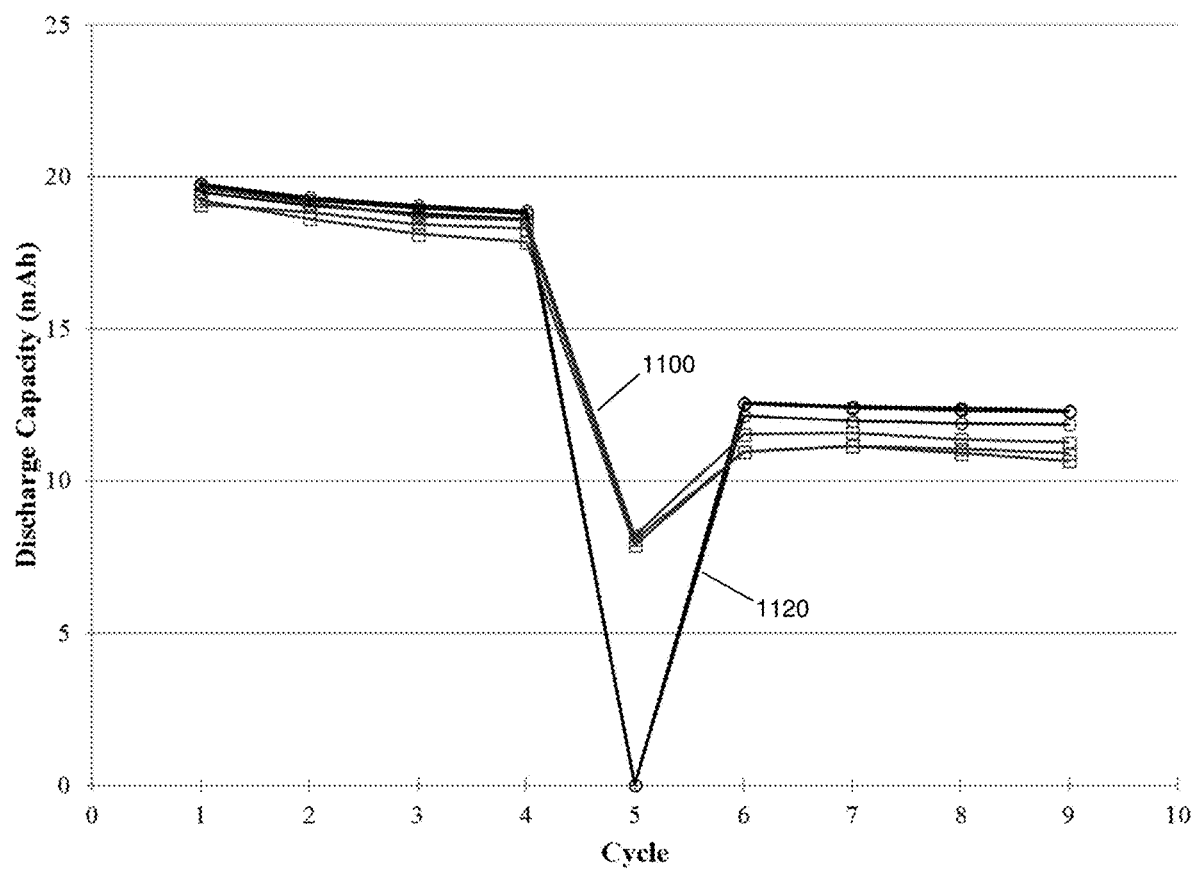
Figure 12:
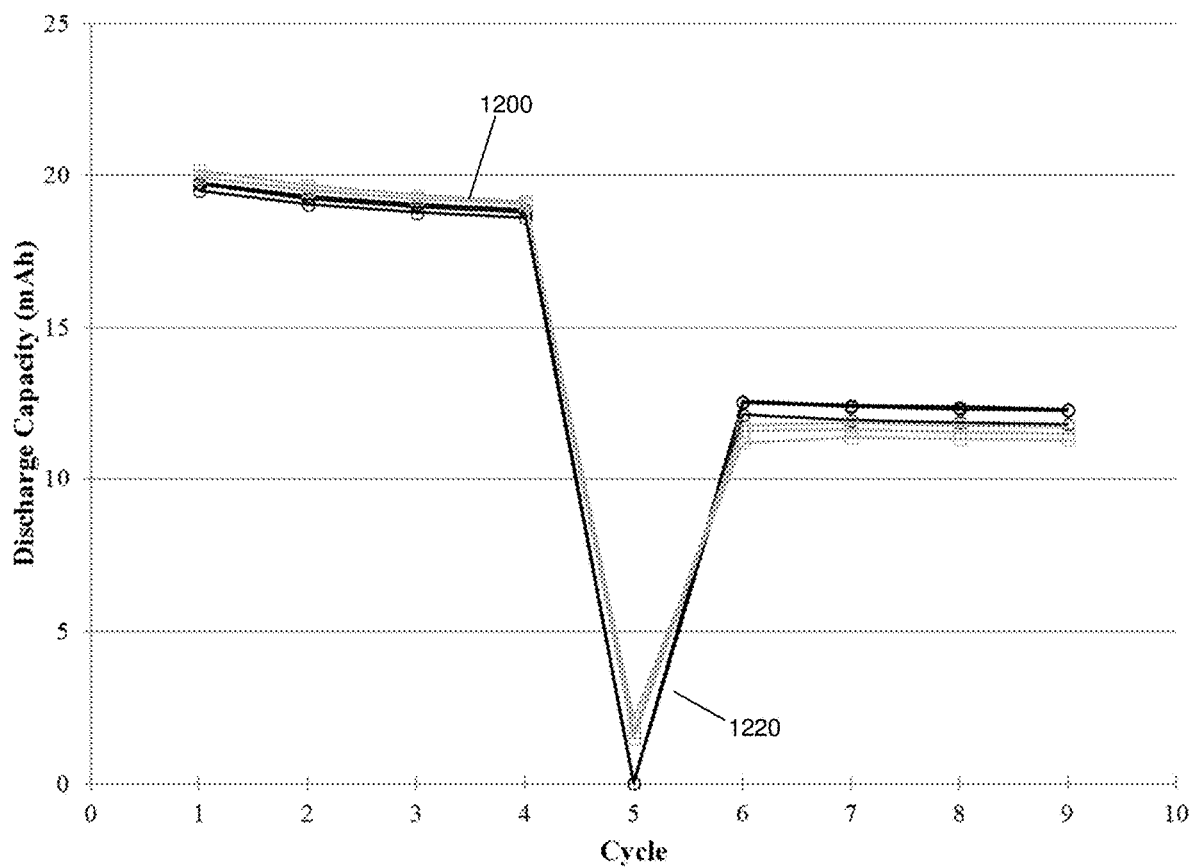
Figure 13:
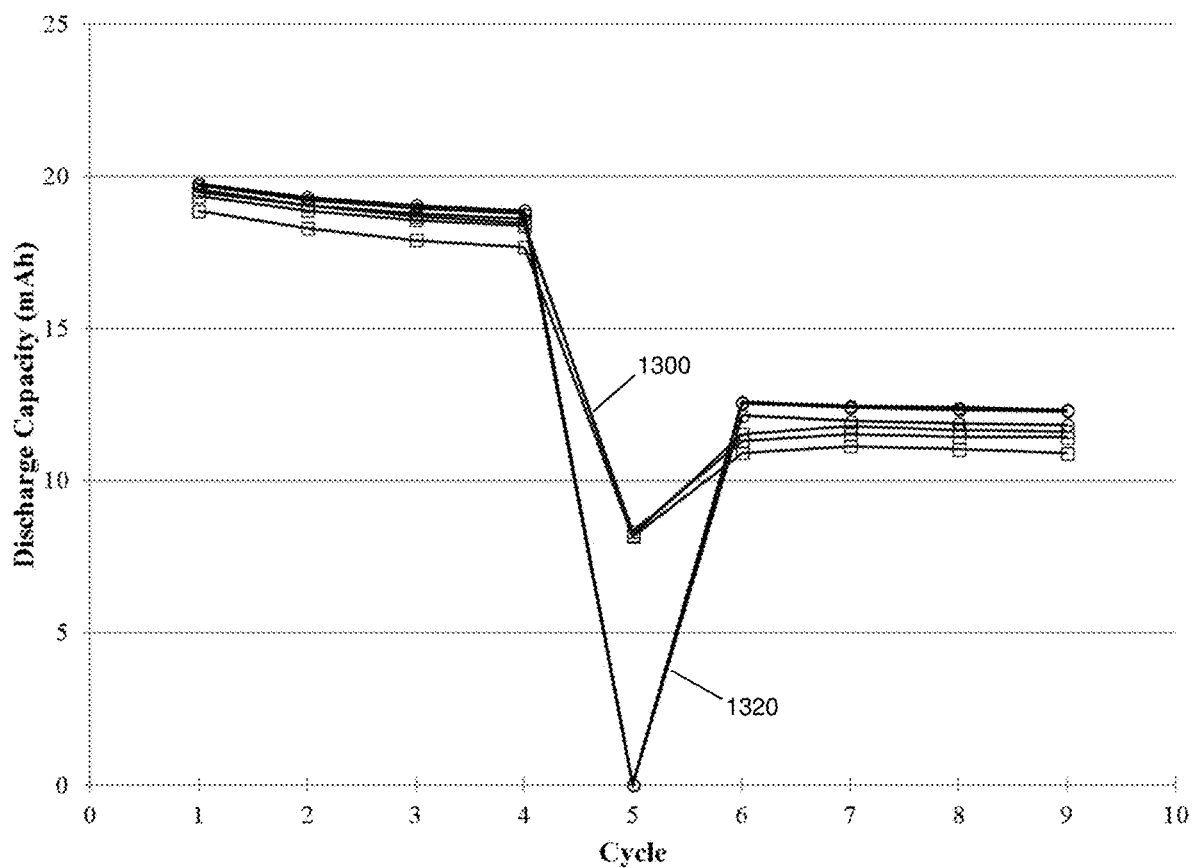
Figure 14:
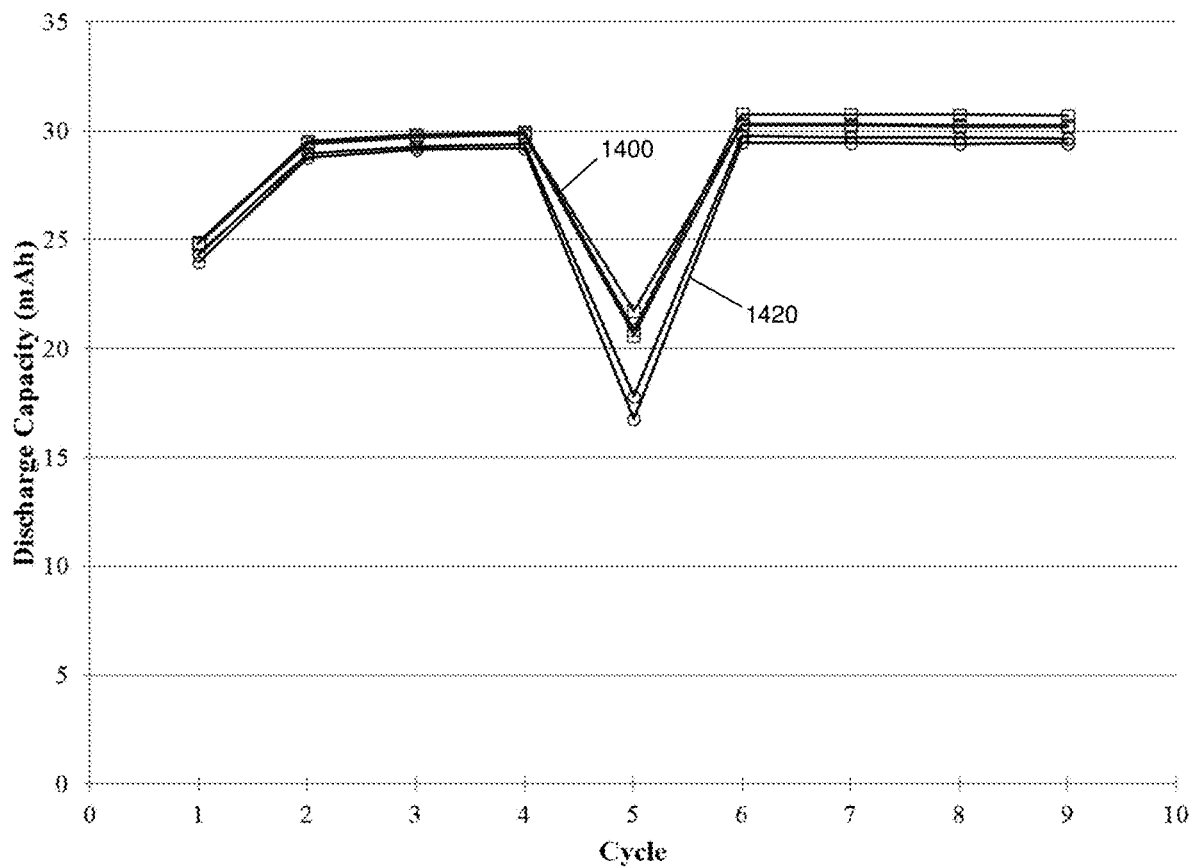
Figure 15:
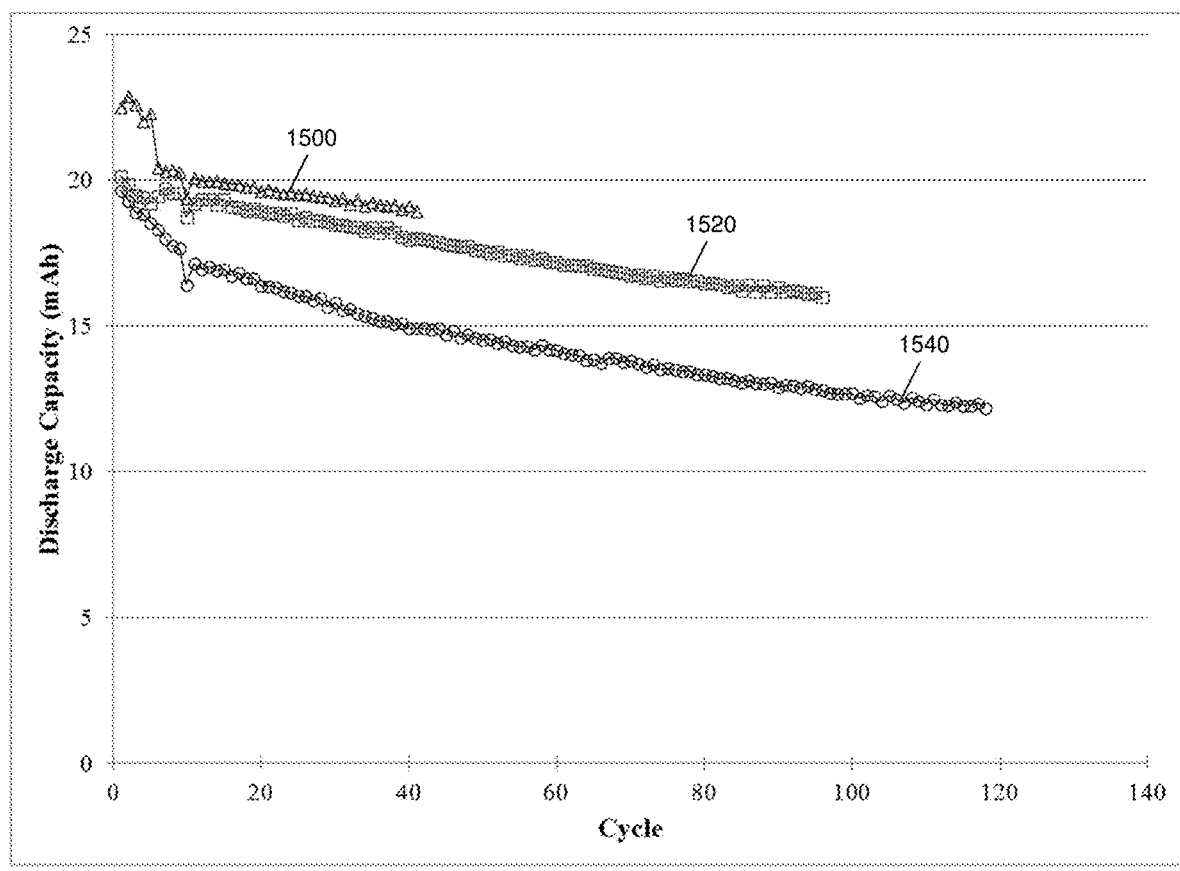

FIG. 11 is an exemplary plot of discharge capacity as a function of cycle for electrochemical cells comprising a graphite anode and an LFP cathode with a 0.5 μm-thick lithium oxysulfide coating, according to some embodiments, where the electrochemical cells were cycled at room temperature for the first 5 cycles, stored at full charge in a 60° C. oven for 1 week, then cycled at room temperature for an additional 5 cycles;

FIG. 12 is an exemplary plot of discharge capacity as a function of cycle for electrochemical cells comprising a 2 μm-thick lithium oxide layer on a graphite anode, according to some embodiments, where the electrochemical cells were cycled at room temperature for the first 5 cycles, stored at full charge in a 60° C. oven for 1 week, then cycled at room temperature for an additional 5 cycles;

FIG. 13 is an exemplary plot of discharge capacity as a function of cycle for electrochemical cells comprising, according to some embodiments, a 2 μm-thick lithium oxide layer on a graphite anode and a 2 μm-thick lithium oxide layer on an LFP cathode, according to some embodiments, where the electrochemical cells were cycled at room temperature for the first 5 cycles, stored at full charge in a 60° C. oven for 1 week, then cycled at room temperature for an additional 5 cycles;

FIG. 14 is an exemplary plot of discharge capacity as a function of cycle for electrochemical cells comprising a 2 μm-thick lithium oxide layer on a graphite anode and a 2 μm-thick lithium oxide layer on a lithium nickel manganese cobalt oxide ("NMC" or "NCM") cathode, according to some embodiments, where the electrochemical cells were cycled at room temperature for the first 5 cycles, stored at full charge in a 60° C. oven for 1 week, then cycled at room temperature for an additional 5 cycles;

FIG. 15 is an exemplary plot of discharge capacity as a function of cycle for electrochemical cells comprising a graphite anode and an LFP cathode, a graphite anode and an LFP cathode coated with a 0.5 μm-thick layer of lithium oxysulfide, and a graphite anode and an LFP cathode coated with a 1 μm-thick layer of lithium oxysulfide, according to some embodiments, where the electrochemical cells were cycled at room temperature for the first 5 cycles, then cycled at 50° C.

Figure 16:
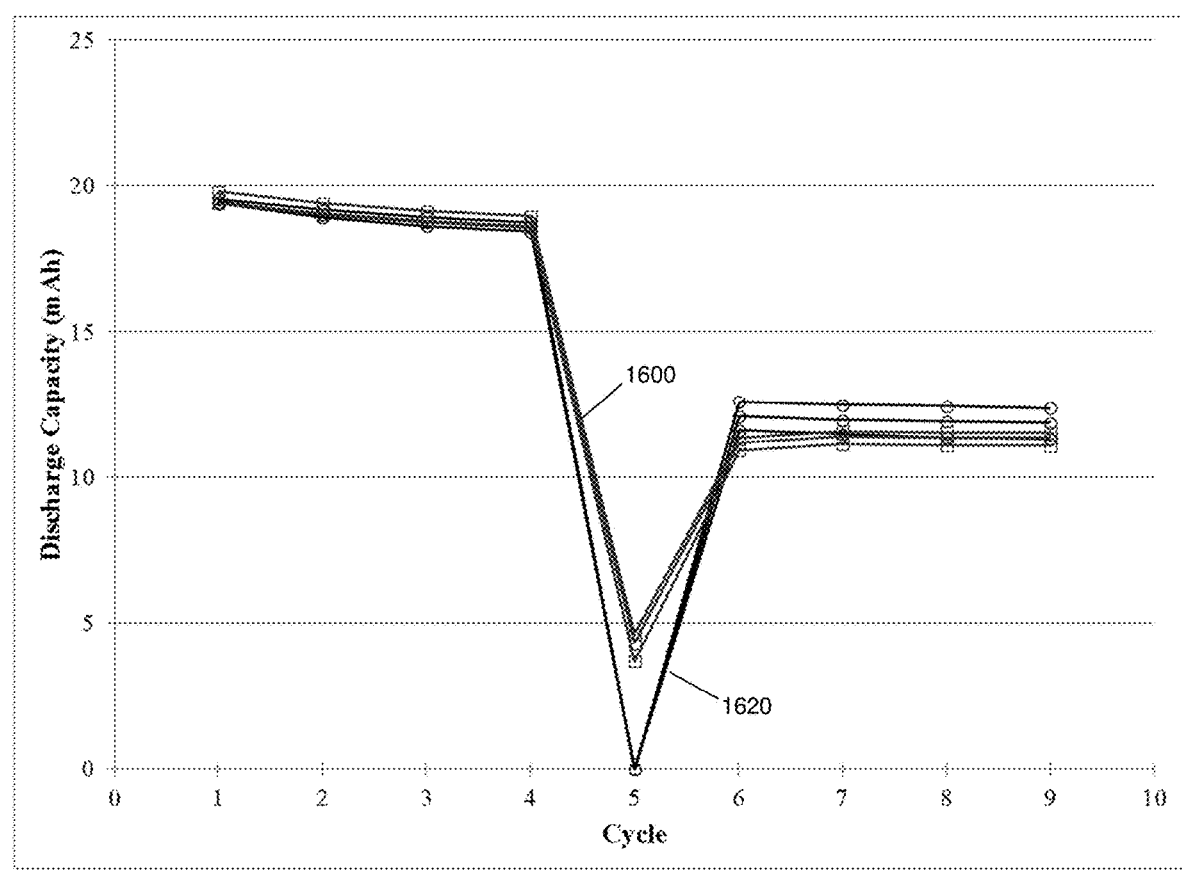
Figure 17:
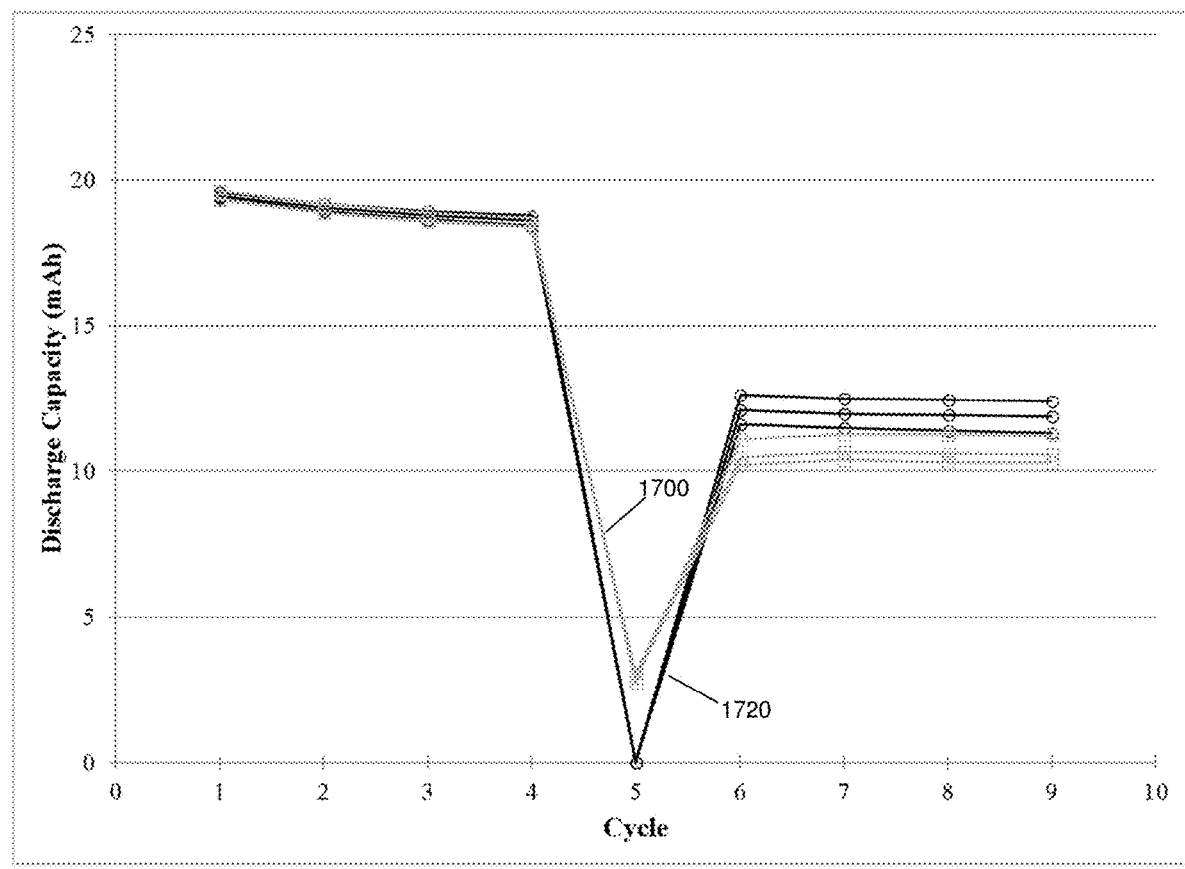
Figure 18A:
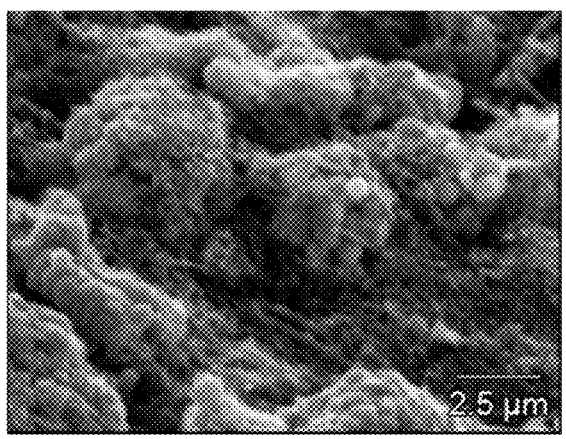
Figure 18B:
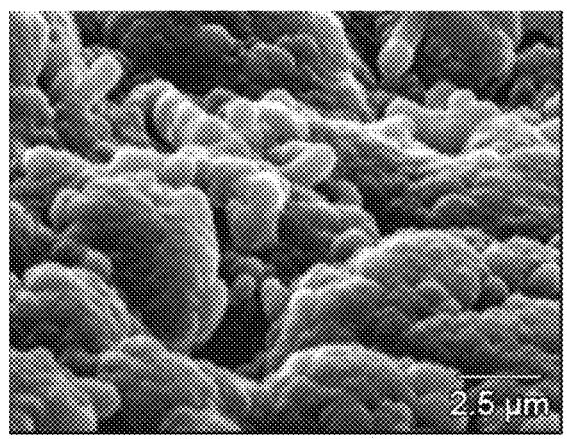
Figure 19:
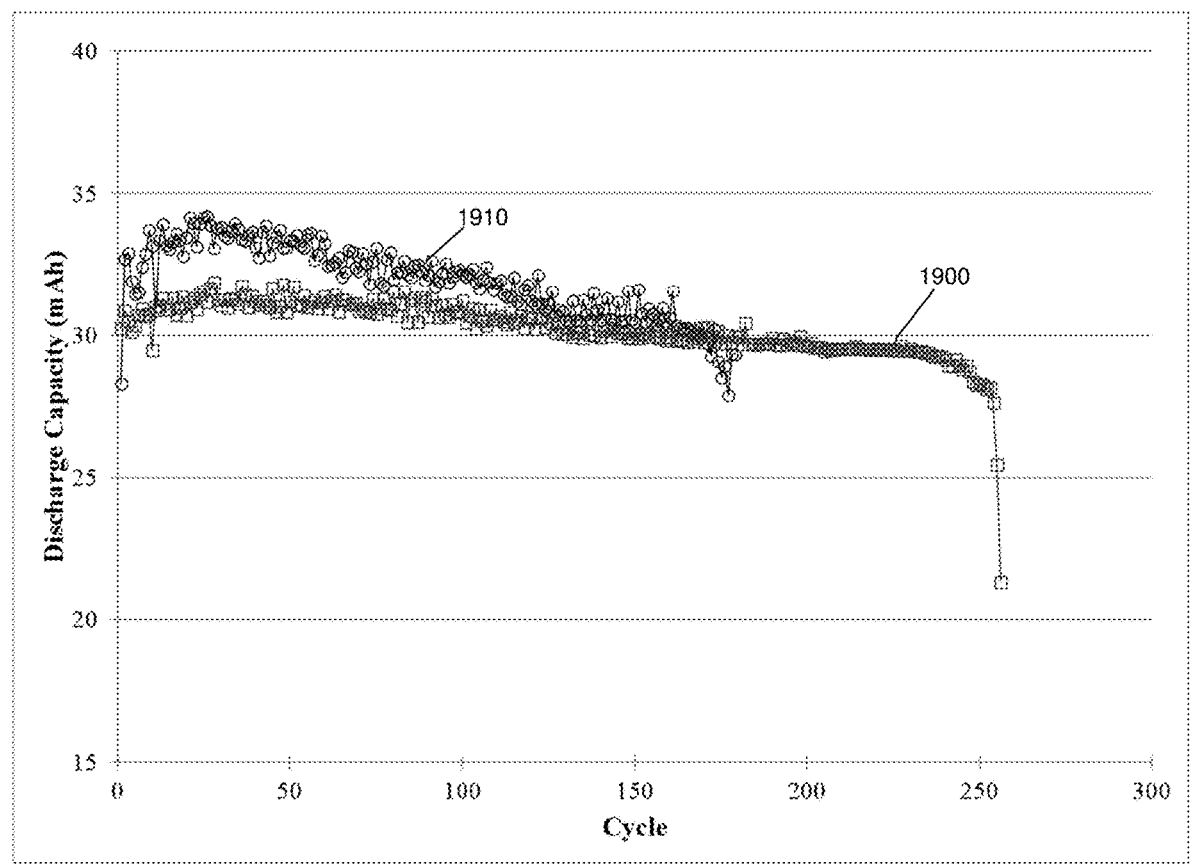
Figure 20A:
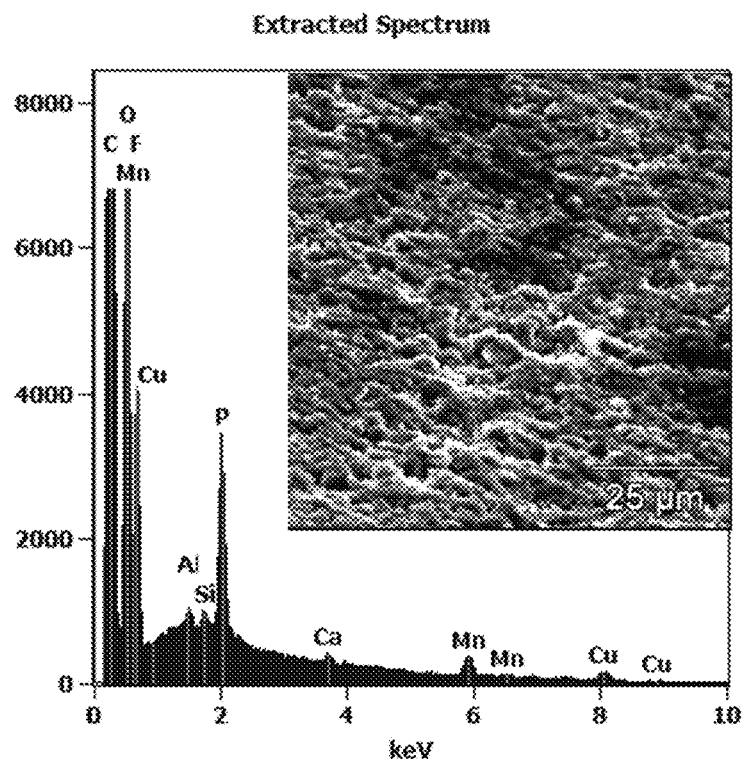
Figure 20B:
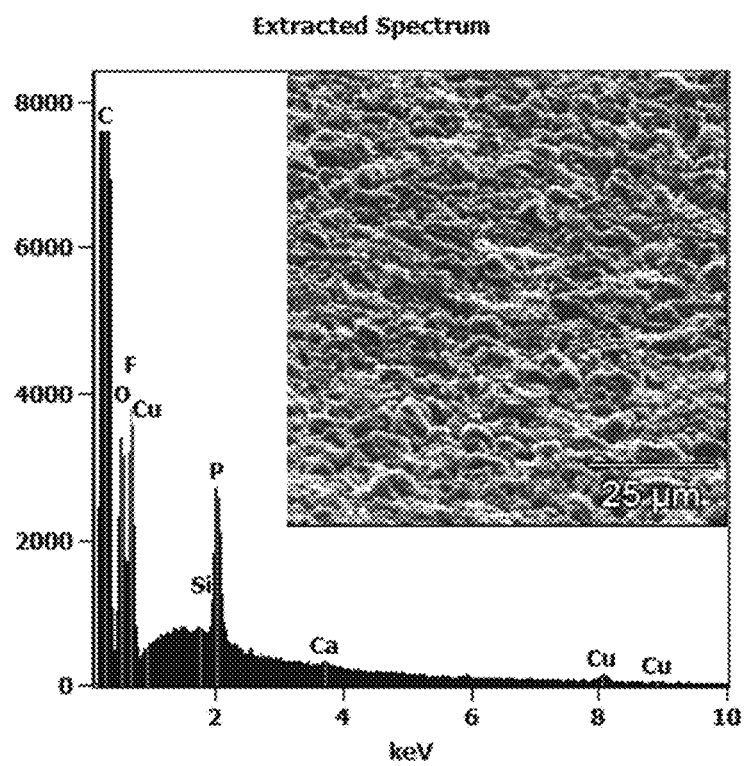
Figure 21A:
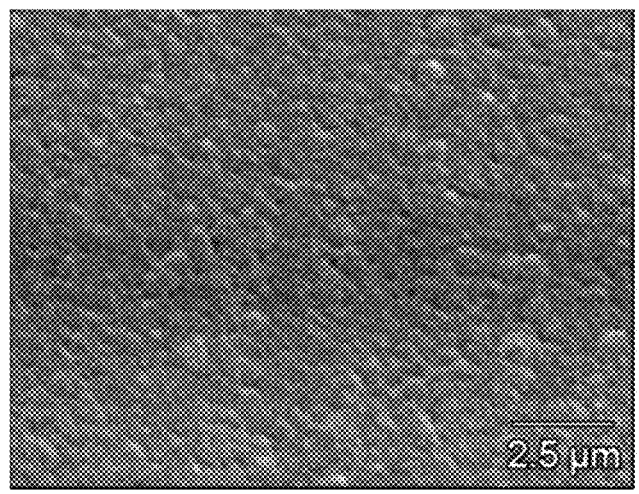
Figure 21B:
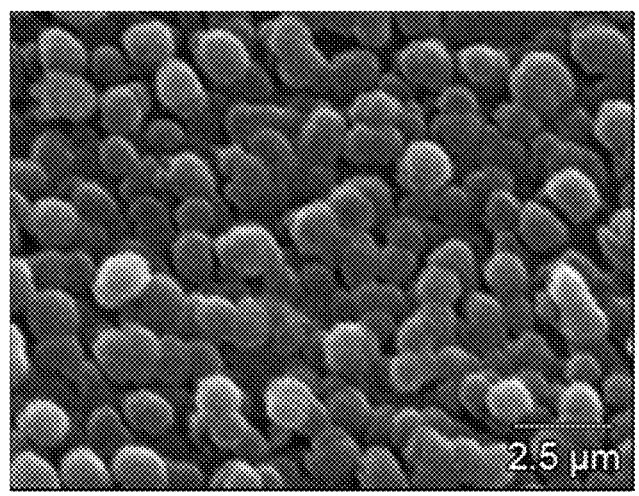

FIG. 16 is an exemplary plot of discharge capacity as a function of cycle for electrochemical cells comprising a graphite anode and an LFP cathode coated with a 1 μm-thick layer of lithium oxysulfide, according to some embodiments, where the electrochemical cells were cycled at room temperature for the first 5 cycles, stored at full charge in a 60° C. oven for 1 week, then cycled at room temperature for an additional 5 cycles;

FIG. 17 is an exemplary plot of discharge capacity as a function of cycle for electrochemical cells comprising a graphite anode coated with a 1 μm-thick layer of lithium oxysulfide and an LFP cathode, according to some embodiments, where the electrochemical cells were cycled at room temperature for the first 5 cycles, stored at full charge in a 60° C. oven for 1 week, then cycled at room temperature for an additional 5 cycles FIG. 18A is an SEM image of an uncoated NCM cathode, according to some embodiments;

FIG. 18B is an SEM image of an NCM cathode coated with a 1 μm-thick layer of lithium oxide, according to some embodiments;

FIG. 19 is, according to some embodiments, an exemplary plot of discharge capacity as a function of cycle for electrochemical cells comprising a graphite anode and an NCM cathode coated with a 1 μm-thick layer of lithium oxide, where the electrochemical cells were cycled at room temperature for the first 5 cycles, then cycled at 50° C. FIG. 20A is an EDS spectrum and SEM image (inset) of a graphite anode from an electrochemical cell comprising an uncoated NCM cathode after 179 cycles (initial 5 cycles at room temperature, then at 50° C.), according to some embodiments;

FIG. 20B is an EDS spectrum and SEM image (inset) of a graphite anode from an electrochemical cell comprising a lithium-oxide-coated NCM cathode after 191 cycles (initial 5 cycles at room temperature, then at 50° C.), according to some embodiments;

FIG. 21A is, according to some embodiments, an SEM image of a top-down view of a substantially continuous lithium-ion-conductive layer; and FIG. 21B is, according to some embodiments, an SEM image of a top-down view of a substantially porous lithium-ion-conductive layer.

DETAILED DESCRIPTION

Lithium-ion electrochemical cells, and associated electrodes and methods, are generally described. Certain embodiments are related to the recognition that a protective lithium-ion-conductive layer can be positioned between a positive electrode (e.g., a cathode) and a negative electrode (e.g., an anode) within a lithium-ion electrochemical cell to inhibit the transportation of electrochemical byproducts (e.g., side reaction byproducts, dissolution/leaching products) between the positive electrode and the negative electrode.

The performance of lithium-ion electrochemical cells can be inhibited by a number of mechanisms. For example, in certain lithium-ion electrochemical cells, active lithium can be lost due to side reactions of the lithium with the electrolyte. In some cases, the electrolyte can decompose at the cathode and/or anode of the electrochemical cell, which can lead to increased cell impedance. In certain cases, electrolyte decomposition can result in deleterious acidic byproducts, such as hydrofluoric acid (HF). In some instances, non-lithium metal cations within the lithium-ion cathode can be dissolved and subsequently reduced to metallic clusters at the anode, which can degrade the passivation layer on the anode and further lead to detrimental side reactions of lithium with the electrolyte. Loss of non-lithium metal cations can also lead to changes in the lithium-ion cathode structure and/or loss of active material in the cathode.

It has been discovered, according to certain embodiments of the present invention, that positioning a lithium-ion-conductive material (e.g., an inorganic lithium-ion-conductive material such as a lithium-ion-conductive ceramic) between the anode and the cathode of a lithium-ion electrochemical cell can reduce the degree to which electrochemical cell byproducts or other undesirable species are transported between the electrodes of the lithium-ion electrochemical cell. It is believed that, by inhibiting the transport of such byproducts or species between the electrodes of the electrochemical cell, the structures of the electrodes are better maintained, less electrolyte is lost or decomposed, and/or less active lithium is lost within the electrochemical cell, thus enhancing cell performance (e.g., increasing cycle life).

According to some embodiments, a lithium-ion-conductive layer may inhibit transport of certain deleterious electrochemical cell byproducts or species between electrodes by, for example, neutralizing and/or mitigating the byproducts or species. For example, in some electrochemical cells, hydrolysis of certain lithium salts (e.g., $LiPF_6$) in an electrolyte may result in hydrofluoric acid (HF) production. The presence of a lithium-ion-conductive material in the electrochemical cell may act as an acid trap, neutralizing the HF, and/or may act as a water vapor trap, mitigating hydrolysis by reacting with water and reducing the amount of water available for hydrolysis of lithium salts. In some embodiments, a lithium-ion-conductive layer may inhibit transport of certain deleterious electrochemical cell byproducts or species between electrodes by physically impeding transport of the byproducts. For example, in some electrochemical cells, a lithium-ion-conductive layer may provide a physical barrier that is impermeable to certain electrochemical cell byproducts (e.g., non-lithium metal cations). Other mechanisms for inhibiting transport of certain deleterious electrochemical cell byproducts or species are also possible.

According to certain embodiments, the lithium-ion-conductive layer can be integrated with a porous and/or particulate electroactive material-containing layer. The lithium-ion-conductive layers incorporated into such electrodes can, in some embodiments, be made sufficiently thin, yet effective for inhibiting or reducing the rate of transport of byproducts or species, and with sufficient ion conductivity to effectively transport lithium ions across the layer.

Figure 1:
FIG. 1 is a cross-sectional schematic illustration of an electrode, according to some embodiments.

FIG. 1 is an exemplary cross-sectional schematic illustration of electrode 100, according to certain embodiments. In FIG. 1, electrode 100 comprises electroactive-material-containing layer (also referred to as "electroactive material layer") 102 and lithium-ion-conductive layer 104. In some embodiments, lithium-ion-conductive layer 104 is integrated with electroactive-material-containing layer 102. As used herein, lithium-ion-conductive layer 104 is "integrated with" electroactive-material-containing layer 102 if the two layers are coupled (directly or indirectly) such that they cannot be separated without damaging at least one of the two layers or damaging one or more intervening layers positioned between the two layers. In some embodiments, electroactive-material-containing layer 102 is positioned adjacent lithium-ion-conductive layer 104. In certain cases, such as the embodiment illustrated in FIG. 1, electroactive-material-containing layer 102 is in direct physical contact with lithium-ion-conductive layer 104. However, in certain other embodiments, one or more intervening layers (not shown in FIG. 1) are positioned between electroactive-material-containing layer 102 and lithium-ion-conductive layer 104. For example, an intervening layer positioned between electroactive-material-containing layer 102 and lithium-ion-conductive layer 104 may provide a surface that is relatively smoother than the surface of electroactive-material-containing layer 102. It has been recognized that it may be advantageous, in certain embodiments, to provide a smoother surface in order to enhance deposition of lithium-ion-conductive layer 104 on electroactive-material-containing layer 102 (e.g., a smoother surface may allow lithium-ion-conductive layer 104 to be deposited in a more continuous manner, potentially increasing the smoothness and/or reducing the number of defects in lithium-ion-conductive layer 104). A non-limiting example of an intervening layer that may be appropriate for providing a smoother surface for deposition of lithium-ion-conductive layer 104 is a polymer layer. Suitable polymers include, but are not limited to, polyvinylidene fluoride, polyvinylidene fluoride-hexafluoropropylene copolymer, polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing. Another non-limiting example of an intervening layer that may be used to provide a smoother surface is a layer comprising particles (e.g., nanoparticles) of the electroactive material and/or additives of electroactive-material-containing layer 102, where the particles of the intervening layer have a mean maximum cross-sectional dimension that is smaller than the particles of electroactive-material-containing layer 102. Additionally, non-planar arrangements, arrangements with proportions of materials different than those shown, and other alternative arrangements are useful in connection with the present invention.

As used herein, when a layer is referred to as being (e.g., disposed) "on," "on top of," or "adjacent" another layer, it can be directly on, on top of, or adjacent the layer, or an intervening layer may also be present. A layer that is "directly on," "directly adjacent," or "in contact with" another layer means that no intervening layer is present. Likewise, a layer that is positioned "between" two layers may be directly between the two layers such that no intervening layer is present, or an intervening layer may be present.

In some embodiments, the lithium-ion-conductive layer comprises an inorganic material. For example, in certain cases, the lithium-ion-conductive layer comprises a ceramic material. The ceramic material may have a crystalline, polycrystalline, partially crystalline, or amorphous structure. Suitable ceramic materials include, but are not limited to, oxides, carbonates, nitrides, carbides, sulfides, oxysulfides, and/or oxynitrides of metals and/or metalloids. In some cases, the ceramic material comprises lithium. Non-limiting examples of suitable ceramic materials comprising lithium include lithium oxides (e.g., $Li_2O$, LiO, $LiO_2$, $LiRO_2$, where R is scandium, yttrium, lanthanum, cerium, praseodymium, neodymium, promethium, samarium, europium, gadolinium, terbium, dysprosium, holmium, erbium, thulium, ytterbium, and/or lutetium), lithium carbonate ($Li_2CO_3$), lithium nitrides (e.g., $Li_3N$), lithium oxysulfide, lithium oxynitride, lithium garnet-type oxides (e.g., $Li_7La_3Zr_2O_{12}$), $Li_{10}GeP_2S_{12}$, lithium phosphorus oxynitride, lithium silicosulfide, lithium germanosulfide, lithium lanthanum oxides, lithium titanium oxides, lithium borosulfide, lithium aluminosulfide, lithium phosphosulfide, lithium silicate, lithium borate, lithium aluminate, lithium phosphate, lithium halides, and combinations of the above. In certain cases, the ceramic material comprises a lithium oxide, a lithium nitride, or a lithium oxysulfide. In some embodiments, the ceramic includes a carbonate and/or a carbide. In some particular embodiments, the lithium-ion-conductive layer comprises or is formed of a mixture of an oxide, a carbonate, and in some cases, a carbide. For instance, the material may include lithium oxide, lithium carbonate, and/or lithium carbide. Other materials are also possible.

In many embodiments described herein, the lithium-ion-conductive layer is selected to be non-electroactive (e.g., the layer does not participate in lithium intercalation processes or lithium conversion reactions). Additionally, in some embodiments, the lithium-ion-conductive layer is selected to substantially impede the passage of certain species such as certain non-lithium ions. For example, the lithium-ion-conductive layer may provide a physical barrier that is impermeable to certain non-lithium ions, neutralize and/or mitigate the ions, or otherwise prevent or reduce the rate of passage of the ions through the lithium-ion-conductive layer. In certain embodiments, the lithium-ion-conductive layer may substantially impede or reduce the rate of passage, from the cathode to the anode and/or across the lithium-ion-conductive layer, of certain ions such as certain non-lithium metal cations (e.g., metal cations that do not include $Li^+$) resulting from dissolution and/or leaching of the cathode. However, the lithium-ion-conductive layer is generally selected to be conductive to lithium ions (e.g., the lithium-ion-conductive layer allows passage of lithium ions between the anode and the cathode, permitting the lithium-ion electrochemical cell to function).

One method of determining lithium ion conductivity is electrochemical impedance spectroscopy (EIS). For example, the lithium-ion-conductive layer may be placed between two electrodes, and resistance may be measured over a range of frequencies from 100,000 Hz to 0.01 Hz at an amplitude of 5 mV. The lithium ion conductivity of the lithium-ion-conductive layer may then be calculated from the measured resistance values. In some embodiments, the lithium-ion-conductive layer has a lithium ion conductivity greater than or equal to about $10^{-8}$ S/cm, greater than or equal to about $10^{-7}$ S/cm, greater than or equal to about $10^{-6}$ S/cm, greater than or equal to about $10^{-5}$ S/cm, greater than or equal to about $10^{-4}$ S/cm, greater than or equal to about $10^{-3}$ S/cm, greater than or equal to about $10^{-2}$ S/cm, greater than or equal to about $10^{-1}$ S/cm, or greater than or equal to about 1 S/cm. In some embodiments, the lithium-ion-conductive layer has a lithium ion conductivity of less than or equal to about 1 S/cm, less than or equal to about $10^{-1}$ S/cm, less than or equal to about $10^{-2}$ S/cm, less than or equal to about $10^{-3}$ S/cm, less than or equal to about $10^{-4}$ S/cm, less than or equal to about $10^{-5}$ S/cm, less than or equal to about $10^{-6}$ S/cm, less than or equal to about $10^{-7}$ S/cm, or less than or equal to about $10^{-8}$ S/cm. Combinations of the above-referenced ranges are also possible.

In some embodiments, the lithium-ion-conductive layer is substantially continuous. For instance, the lithium-ion-conductive layer may be substantially free of pores, gaps, defects, or discontinuities, e.g., across the thickness of the layer. FIG. 21A shows a scanning electron microscope (SEM) image of a top-down view of an exemplary substantially continuous lithium-ion-conductive layer. In some cases, the lithium-ion-conductive layer is substantially free of discontinuities (e.g., holes, pores or defects) that are larger than about 1000 nm, about 500 nm, about 100 nm, about 50 nm, about 10 nm, about 5 nm, about 1 nm, about 0.5 nm, about 0.1 nm, about 0.05 nm, or about 0.01 nm. In certain embodiments, discontinuities within the lithium-ion-conductive layer (such as those within one or more of the size ranges noted above) occupy less than about 5%, less than about 1%, or less than about 0.1% of the external geometric surface area of the lithium-ion-conductive layer. As used herein, the "external geometric surface area" refers to the surface area of the external geometric surface of the lithium-ion-conductive layer. The "external geometric surface" of the lithium-ion-conductive layer refers to the surface defining the outer boundaries of the layer when analyzed at substantially the same scale as the maximum cross-sectional dimension of the layer. Generally, the external geometric surface of a layer does not include the internal surfaces, such as the surfaces defined by pores within a porous layer.

In some embodiments, the lithium-ion-conductive layer is substantially porous (e.g., the layer comprises a plurality of pores). The term "pore" generally refers to a conduit, void, or passageway, at least a portion of which is surrounded by the medium in which the pore is formed. Generally, voids within a material that are completely surrounded by the material (and, thus, not accessible from outside the material, e.g., closed cells) are not considered pores within the context herein.

In certain embodiments, the porous lithium-ion-conductive layer comprises a plurality of particles. In cases where the lithium-ion-conductive layer comprises a plurality of particles, pores may include both interparticle pores (i.e., those pores defined between particles when they are packed together, e.g., interstices) and intraparticle pores (i.e., those pores lying within the envelopes of individual particles).

In embodiments in which the lithium-ion-conductive layer comprises particles (e.g., particles of lithium-ion-conductive material), the particles may have any suitable shape. In some embodiments, at least a portion of the particles may have a substantially elongated (e.g., columnar) shape. In some cases, the columnar structures have a shape and/or configuration resembling the structures shown in Thornton et al, "Influence of apparatus geometry and deposition conditions on the structure and topography of thick sputtered coatings", *Journal of Vacuum Science & Technology* 11, 666 (1974), which is incorporated herein by reference in its entirety for all purposes. In cases where the plurality of particles comprises a plurality of columnar structures, pores may include both intercolumnar pores and intracolumnar pores. In some embodiments, at least about 10%, at least about 20%, at least about 30%, at least about 40%, at least about 50%, at least about 60%, at least about 70%, at least about 80%, at least about 90%, at least about 95%, at least about 99%, or about 100% of the particles of the porous lithium-ion-conductive layer are columnar structures. In certain embodiments, less than about 100%, less than or equal to about 90%, less than or equal to about 80%, less than or equal to about 70%, less than or equal to 60%, less than or equal to about 50%, less than or equal to 40%, less than or equal to about 30%, less than or equal to 20%, or less than or equal to about 10% of the particles are columnar structures. Combinations of the above-referenced ranges are also possible.

FIG. 21B shows an SEM image of a top-down view of an exemplary substantially porous lithium-ion-conductive layer comprising a plurality of columnar structures. It should be appreciated, however, that the particles of a layer may also have any other suitable shape (e.g., substantially spherical, substantially elliptical, irregular). The particles may have any suitable cross-sectional shape, such as, for example, circular, elliptical, polygonal (e.g., triangular, rectangular, etc.), irregular, and the like.

In embodiments in which the lithium-ion-conductive layer comprises particles (e.g., particles of lithium-ion-conductive material), the particles may have any suitable size. In some embodiments, the particles have a mean maximum dimension (e.g., length) of about 10 micrometers (μm) or less, about 5 μm or less, about 2 μm or less, about 1.5 μm or less, about 1 μm or less, about 500 nanometers (nm) or less, about 100 nm or less, about 50 nm or less, about 20 nm or less, or about 10 nm or less. In some embodiments, the particles have a mean maximum dimension of at least about 10 nm, at least about 20 nm, at least about 50 nm, at least about 100 nm, at least about 500 nm, at least about 1 μm, at least about 1.5 μm, at least about 2 μm, at least about 5 μm, or at least about 10 μm. Combinations of the above-noted ranges are also possible. As used herein, the "maximum dimension" of a particle refers to the largest distance between two opposed boundaries of an individual particle that can be measured (e.g., length, diameter). The "mean maximum dimension" of a plurality of particles refers to the number average of the maximum dimensions of the plurality of particles (e.g., where n is at least 20).

In some embodiments, the particles (e.g., particles of lithium-ion-conductive material) can be at least partially fused together with other particles. Fused particles generally refers to the physical joining of two or more particles such that they form a single particle. For example, in some cases, the volume occupied by a single particle (e.g., the entire volume within the outer surface of the particle) prior to fusion is substantially equal to half the volume occupied by two fused particles. Those skilled in the art would understand that the term "fused" does not refer to particles that simply contact one another at one or more surfaces, but particles wherein at least a portion of the original surface of each individual particle can no longer be discerned from the other particle.

In some cases, the particles are fused such that at least a portion of the plurality of particles form a continuous pathway across the layer (e.g., between a first surface of the layer and a second surface of the layer). A continuous pathway may include, for example, an ionically-conductive pathway from a first surface to a second, opposing surface of the layer in which there are substantially no gaps, breakages, or discontinuities in the pathway. Whereas fused particles across a layer may form a continuous pathway, a pathway including packed, unfused particles would have gaps or discontinuities between the particles that would not render the pathway continuous. In certain aspects, the layer includes a plurality of such continuous pathways across the layer. In some aspects, at least 10 vol %, at least 30 vol %, at least 50 vol %, or at least 70 vol % of the layer comprises one or more continuous pathways comprising fused particles (e.g., which may comprise an ionically conductive material). In certain aspects, less than or equal to about 100 vol %, less than or equal to about 90 vol %, less than or equal to about 70 vol %, less than or equal to about 50 vol %, less than or equal to about 30 vol %, less than or equal to about 10 vol %, or less than or equal to about 5 vol % of the second layer comprises one or more continuous pathways comprising fused particles. Combinations of the above-referenced ranges are also possible (e.g., at least about 10 vol % and less than or equal to about 100 vol %). In some cases, 100 vol % of the layer comprises one or more continuous pathways comprising fused particles. In some aspects, the layer consists essentially of fused particles (e.g., the layer comprises substantially no unfused particles). In other aspects, substantially all of the particles are unfused.

In some embodiments, the particles of the lithium-ion-conductive layer have a mean maximum cross-sectional dimension (e.g., diameter, width) of about 5 μm or less, about 2 μm or less, about 1.5 μm or less, about 1 μm or less, about 500 nm or less, about 100 nm or less, about 50 nm or less, about 20 nm or less, about 10 nm or less, about 5 nm or less, about 2 nm or less, or about 1 nm or less. In some embodiments, the particles of the lithium-ion-conductive layer have a mean maximum cross-sectional dimension (e.g., diameter, width) of at least about 1 nm, at least about 2 nm, at least about 5 nm, at least about 10 nm, at least about 20 nm, at least about 50 nm, at least about 100 nm, at least about 500 nm, at least about 1 μm, at least about 1.5 μm, at least about 2 μm, at least about 5 μm, or at least about 10 μm. Combinations of the above-noted ranges are also possible. As used herein, the "maximum cross-sectional dimension" of a particle refers to the largest distance between two opposed boundaries of an individual particle that can be measured in a plane orthogonal to the axis along which the maximum dimension of the particle can be measured. The "mean maximum cross-sectional dimension" of a plurality of particles refers to the number average of the maximum cross-sectional dimensions of the plurality of particles (e.g., where n is at least 20).

One of ordinary skill in the art would be capable of calculating the mean maximum dimension and/or mean maximum cross-sectional dimension of the plurality of particles. For example, the maximum dimensions and/or maximum cross-sectional dimensions of individual particles may be determined through analysis of scanning electron microscope (SEM) images of the particles. In a non-limiting, illustrative example, a first cross-sectional plane of an electrochemical cell at a depth halfway through the thickness of the electrochemical cell may be imaged using SEM. Through analysis of the resultant images, the mean maximum cross-sectional dimension of the particles may be determined. In certain cases, a backscatter detector and/or an energy-dispersive spectroscopy (EDS) detector may be used to facilitate identification of lithium-ion-conductive material particles (e.g., as distinguished from particles of additives that may be present). In embodiments comprising agglomerated particles, the particles should be considered separately when determining the maximum cross-sectional dimensions. The measurement could be performed by establishing boundaries between each of the agglomerated particles, and measuring the maximum cross-sectional dimension of the hypothetical, individuated particles that result from establishing such boundaries. The distribution of maximum cross-sectional dimensions and particle volumes could also be determined by one of ordinary skill in the art using SEM analysis. The mean maximum cross-sectional dimension of the plurality of particles may be obtained by calculating the arithmetic mean of the maximum cross-sectional dimensions of the particles. In another non-limiting, illustrative example, a second cross-sectional plane that is orthogonal to the first cross-sectional plane and is halfway through the length or width of the electrochemical cell may be imaged using SEM. In some cases, the mean maximum dimension of the particles may be determined through analysis of the resultant images. In some embodiments, at least 20 measurements may be used to calculate an average value.

In some cases, at least a portion of the particles (e.g., columnar structures) of the lithium-ion-conductive layer may be substantially aligned. For example, in embodiments in which the plurality of particles comprises a plurality of columnar structures, at least a portion of the columnar structures may be substantially vertically aligned. As used herein, a columnar structure of a lithium-ion-conductive layer in an electrochemical cell comprising an anode and a cathode is "vertically aligned" if an angle between the axis along which the maximum dimension (e.g., length) of the columnar structure can be measured (e.g., a longitudinal axis) and the axis running from the anode to the cathode is about 45° or less. The angle may be determined, for example, through SEM image analysis. In some embodiments, at least about 10%, at least about 20%, at least about 30%, at least about 40%, at least about 50%, at least about 60%, at least about 70%, at least about 80%, at least about 90%, at least about 95%, at least about 99%, or about 100% of the particles of the lithium-ion-conductive layer are substantially aligned. In certain embodiments, less than about 100%, less than or equal to about 90%, less than or equal to about 80%, less than or equal to about 70%, less than or equal to about 60%, less than or equal to about 50%, less than or equal to about 40%, less than or equal to about 30%, less than or equal to about 20%, or less than or equal to about 10% of the particles of the lithium-ion-conductive layer are substantially aligned. Combinations of the above-referenced ranges are also possible. In certain embodiments, at least about 10%, at least about 20%, at least about 30%, at least about 40%, at least about 50%, at least about 60%, at least about 70%, at least about 80%, at least about 90%, at least about 95%, at least about 99%, or about 100% of the particles of the lithium-ion-conductive layer are substantially vertically aligned. In certain embodiments, less than about 100%, less than or equal to about 90%, less than or equal to about 80%, less than or equal to about 70%, less than or equal to about 60%, less than or equal to about 50%, less than or equal to about 40%, less than or equal to about 30%, less than or equal to about 20%, or less than or equal to about 10% of the particles of the lithium-ion-conductive layer are substantially vertically aligned.

In some embodiments in which the lithium-ion-conductive layer comprises pores, some or all of the pores of a porous lithium-ion-conductive layer can be filled by a fluid (e.g., an electrolyte). In certain cases, at least some of the pores of the lithium-ion-conductive layer are filled with an electrolyte that is a liquid, a gel, a solid polymer, and/or a solid inorganic compound. According to certain embodiments, at least a portion of the porous lithium-ion-conductive layer is permeable to a fluid (e.g., an electrolyte).

The porous lithium-ion-conductive layer may have any suitable porosity. For example, the porous lithium-ion-conductive layer may have a porosity of up to about 1%, up to about 2%, up to about 5%, up to about 10%, up to about 15%, up to about 20%, up to about 25%, up to about 30%, up to about 40%, up to about 50%, up to about 60%, or up to about 70% (where the percentages indicate void volume within the porous lithium-ion-conductive layer). In some embodiments, the porous lithium-ion-conductive layer has a porosity of at least about 1% by volume, at least about 2% by volume, at least about 5% by volume, at least about 10% by volume, at least about 15% by volume, at least about 20% by volume, at least about 25% by volume, at least about 30% by volume, at least about 40% by volume, at least about 50% by volume, at least about 60% by volume, or at least about 70% by volume. Combinations of the above-noted ranges are also possible.

The pores of the lithium-ion-conductive layer may have any suitable size and shape. The pores may comprise any suitable cross-sectional shape such as, for example, circular, elliptical, polygonal (e.g., rectangular, triangular, etc.), irregular, and the like. In some cases, the porous lithium-ion-conductive layer has an average pore size of about 1 μm or less, about 500 nm or less, about 200 nm or less, about 100 nm or less, about 50 nm or less, about 20 nm or less, about 10 nm or less, about 5 nm or less, about 2 nm or less, or about 1 nm or less. In some cases, the porous lithium-ion-conductive layer has an average pore size of at least about 1 nm, at least about 2 nm, at least about 5 nm, at least about 10 nm, at least about 20 nm, at least about 50 nm, at least about 100 nm, at least about 200 nm, at least about 500 nm, or at least about 1 μm. Combinations of the above-noted ranges are also possible.

One of ordinary skill in the art would be capable of calculating the porosity, pore size distribution and the average pore size of the plurality of pores within a layer using mercury intrusion porosimetry, as described in ASTM standard D4284-92, which is incorporated herein by reference in its entirety. For example, the methods described in ASTM standard D4284-92 can be used to produce a distribution of pore sizes plotted as the cumulative intruded pore volume as a function of pore diameter. To calculate the percentage of the total pore volume within the sample that is occupied by pores within a given range of pore diameters, one would: (1) calculate the area under the curve that spans the given range over the x-axis, (2) divide the area calculated in step (1) by the total area under the curve, and (3) multiply by 100%. Average pore size can then be calculated from this information. Optionally, in cases where the layer includes pore sizes that lie outside the range of pore sizes that can be accurately measured using ASTM standard D4284-92, porosimetry measurements may be supplemented using BET surface analysis, as described, for example, in S. Brunauer, P. H. Emmett, and E. Teller, *J. Am. Chem. Soc.*, 1938, 60, 309, which is incorporated herein by reference in its entirety.

In some embodiments, the porous lithium-ion-conductive layer may comprise pores with relatively uniform maximum cross-sectional dimensions. Without wishing to be bound by any theory, such uniformity may be useful in maintaining relatively consistent structural stability throughout the bulk of the porous lithium-ion-conductive layer. In addition, the ability to control the pore size to within a relatively narrow range can allow one to incorporate a large number of pores that are large enough to allow for fluid penetration (e.g., electrolyte penetration) while maintaining sufficiently small pores to preserve structural stability of the porous lithium-ion-conductive layer. In some embodiments, the distribution of pore sizes within the porous lithium-ion-conductive layer can have a standard deviation of less than about 50%, less than about 25%, less than about 20%, less than about 10%, less than about 5%, less than about 2%, or less than about 1% of the mean maximum cross-sectional dimension of the plurality of pores. In some embodiments, the distribution of pore sizes within the porous lithium-ion-conductive layer can have a standard deviation of at least about 1%, at least about 2%, at least about 5%, at least about 10%, at least about 20%, at least about 25%, or at least about 50% of the mean maximum cross-sectional dimension of the plurality of pores. Combinations of the above-referenced ranges are also possible. Standard deviation (lower-case sigma) is given its normal meaning in the art, and can be calculated as:

$$\sigma = \sqrt{\frac{\sum_{i=1}^{n}(D_i - D_{avg})^2}{n-1}} \quad (1)$$

wherein $D_i$ is the maximum cross-sectional dimension of pore i, $D_{avg}$ is the number average of the maximum cross-sectional dimensions of the plurality of pores, and n is the number of pores. The percentage comparisons between the standard deviation and the average pore size outlined above can be obtained by dividing the standard deviation by the average and multiplying by 100%.

In some cases, the lithium-ion-conductive layer is formed from a unitary material. A unitary material may refer to one that is processed such that any individual particles used to form the material cease to be readily separable as individual particles. For example, a unitary material may be formed through a vapor deposition process and/or an aerosol deposition process in some embodiments under certain deposition conditions.

In embodiments described herein, the lithium-ion-conductive layer (e.g., a substantially continuous lithium-ion-conductive layer or a substantially porous lithium-ion-conductive layer) may be deposited by any suitable method, including, but not limited to, sputtering (e.g., diode sputtering, direct current (DC) magnetron sputtering, radio frequency (RF) sputtering, RF magnetron sputtering, pulsed sputtering, dual magnetron sputtering, alternating current (AC) sputtering, mid frequency (MF) sputtering, reactive sputtering), electron beam evaporation, vacuum thermal evaporation, laser ablation, chemical vapor deposition (CVD), thermal evaporation (e.g., resistive, inductive, radiation, and electron beam heating), plasma-enhanced chemical vacuum deposition (PECVD), laser-enhanced chemical vapor deposition, aerosol deposition, ion plating, cathodic arc, and jet vapor deposition. The technique used may depend on a variety of factors, including the type of material being deposited, the thickness of the layer, and the underlying layer on which the lithium-ion-conductive layer is deposited.

In some embodiments, the lithium-ion-conductive layer may be substantially smooth. In certain embodiments, increased smoothness of the lithium-ion-conductive layer may result in enhanced performance of the lithium-ion electrochemical cell, e.g., under certain operating conditions. Accordingly, the lithium-ion-conductive layer may have a relatively low surface roughness. In other embodiments, however, the lithium-ion-conductive layer may be substantially rough. Accordingly, the lithium-ion-conductive layer may have a relatively high surface roughness.

Surface roughness may be quantified using any appropriate method. For example, in some cases, a surface roughness profile of the lithium-ion-conductive layer may be obtained using a profilometer (e.g., a contact profilometer, an optical profilometer). From the surface roughness profile, certain measures of surface roughness, including $R_z$ (e.g., the average of the ten lowest valleys subtracted from the average of the ten highest peaks), $R_a$ (e.g., arithmetic mean surface roughness), and $R_q$ (e.g., root mean square surface roughness), may be obtained. Generally, the surface roughness of the lithium-ion-conductive layer is determined by examining the layer at a 5× magnification.

Surface roughness $R_z$ may be calculated as follows:

$$\frac{1}{10}\sum_{i=1}^{10} R_{pi} - R_{vi} \quad (2)$$

where $R_{pi}$ is the height of the $i^{th}$ highest peak and $R_{vi}$ is the height of the $i^{th}$ lowest valley in a surface roughness profile. In some cases, the lithium-ion-conductive layer has a surface roughness $R_z$ of about 20 μm or less, about 15 μm or less, about 10 μm or less, about 5 μm or less, about 2 μm or less, about 1 μm or less, about 500 nm or less, about 200 nm or less, about 100 nm or less, about 50 nm or less, about 20 nm or less, or about 10 nm or less. In some embodiments, the lithium-ion-conductive layer has a surface roughness $R_z$ of about 10 nm or more, about 20 nm or more, about 50 nm or more, about 100 nm or more, about 200 nm or more, about 500 nm or more, about 1 μm or more, about 2 μm or more, about 5 μm or more, about 10 μm or more, about 15 μm or more, or about 20 μm or more. Combinations of the above-noted ranges are also possible.

Arithmetic mean surface roughness $R_a$ may be calculated as follows:

$$\frac{1}{N}\sum_{i=1}^{N} |R_i| \quad (3)$$

where $R_i$ is the height at the $i^{th}$ point in a surface roughness profile and N is the number of points that were measured. In some cases, the lithium-ion-conductive layer has an arithmetic mean surface roughness $R_a$ of about 20 μm or less, about 15 μm or less, about 10 μm or less, about 5 μm or less, about 2 μm or less, about 1 μm or less, about 500 nm or less, about 200 nm or less, about 100 nm or less, about 50 nm or less, about 20 nm or less, or about 10 nm or less. In certain embodiments, the lithium-ion-conductive layer has an arithmetic mean surface roughness $R_a$ of about 10 nm or more, about 20 nm or more, about 50 nm or more, about 100 nm or more, about 200 nm or more, about 500 nm or more, about 1 μm or more, about 2 μm or more, about 5 μm or more, about 10 μm or more, about 15 μm or more, or about 20 μm or more. Combinations of the above-noted ranges are also possible.

RMS surface roughness $R_q$ may be calculated as follows:

$$\sqrt{\frac{1}{N}\sum_{i=1}^{N} R_i^2} \quad (4)$$

where $R_i$ is the height at the $i^{th}$ point in a surface roughness profile and N is the number of points that were measured. In some cases, the lithium-ion-conductive layer has a root mean square surface roughness $R_q$ of about 20 μm or less, about 15 μm or less, about 10 μm or less, about 5 μm or less, about 2 μm or less, about 1 μm or less, about 500 nm or less, about 200 nm or less, about 100 nm or less, about 50 nm or less, about 20 nm or less, or about 10 nm or less. In certain embodiments, the lithium-ion-conductive layer has a root mean square surface roughness $R_q$ of about 10 nm or more, about 20 nm or more, about 50 nm or more, about 100 nm or more, about 200 nm or more, about 500 nm or more, about 1 µm or more, about 2 µm or more, about 5 µm or more, about 10 µm or more, about 15 µm or more, or about 20 µm or more. Combinations of the above-noted ranges are also possible.

In some embodiments, the lithium-ion-conductive layer may be characterized by a thickness (e.g., a largest dimension measured from a first end of the layer to a second end of the layer in a direction parallel to the axis running from the anode to the cathode). In some cases, the lithium-ion-conductive layer may be relatively thin (e.g., the thickness may be relatively small compared to the other two dimensions of the layer). In some cases, the lithium-ion-conductive layer has a thickness of about 10 µm or less, about 5 µm or less, about 2 µm or less, about 1.5 µm or less, about 1 µm or less, about 0.5 µm or less, or about 0.1 µm. Correspondingly, in certain embodiments, the lithium-ion-conductive layer has a thickness of about 0.1 µm or more, about 0.2 µm or more, about 0.3 µm or more, about 0.5 µm or more, about 0.7 µm or more, about 1 µm or more, about 1.5 µm or more, about 2 µm or more, about 5 µm or more, or about 10 µm. Combinations of the above-noted ranges are also possible. In certain cases, the lithium-ion-conductive layer is substantially uniform in thickness. For example, the percent difference between the largest and smallest measurements of thickness of the lithium-ion-conductive layer may be less than about 80%, less than about 50%, less than about 20%, less than about 10%, less than about 5%, or less than about 1%.

In some embodiments, the lithium-ion-conductive layer is relatively basic. For example, the lithium-ion-conductive layer may comprise a material that is selected from species that can donate electron pairs (e.g., a Lewis base). Examples of suitable electron-donating materials include, but are not limited to, lithium oxides (e.g., $Li_2O$, $LiO$, $LiO_2$, $LiRO_2$, where R is scandium, yttrium, lanthanum, cerium, praseodymium, neodymium, promethium, samarium, europium, gadolinium, terbium, dysprosium, holmium, erbium, thulium, ytterbium, and/or lutetium), lithium carbonate ($Li_2CO_3$), lithium nitrides (e.g., $Li_3N$), lithium oxysulfide, lithium oxynitride, lithium garnet-type oxides (e.g., $Li_7La_3Zr_2O_{12}$), $Li_{10}GeP_2S_{12}$, lithium phosphorus oxynitride, lithium silicosulfide, lithium germanosulfide, lithium lanthanum oxides, lithium titanium oxides, lithium borosulfide, lithium aluminosulfide, lithium phosphosulfide, lithium silicate, lithium borate, lithium aluminate, lithium phosphate, lithium halides, and combinations of the above. For example, in some embodiments, 1 mole of a material of the lithium-ion-conductive layer (e.g., $Li_2O$) may neutralize 1 mole of an acid (e.g., HF). It has been recognized that it may be advantageous for the lithium-ion-conductive layer to be relatively basic (e.g., comprising a Lewis base), in some embodiments, because a basic material may be capable of at least partially neutralizing deleterious acidic byproducts that result from certain side reactions. For example, hydrolysis of certain components of an electrolyte such as lithium salts (e.g., $LiPF_6$) in a lithium-ion electrochemical cell may result in acidic byproducts, such as HF. The presence of a lithium-ion-conductive layer in the electrochemical cell may, in certain embodiments, neutralize at least a portion of any HF that may form.

As shown in FIG. 1, the electrode may further comprise a layer comprising an electroactive material, such as a material that is capable of participating in a lithium intercalation process (e.g., a material in which lithium ions can reversibly be inserted and extracted) and/or a material that is capable of chemically reacting with lithium (e.g., a material that can participate in a lithium conversion reaction). An electrode comprising an electroactive material that is capable of participating in a lithium intercalation process is referred to as a "lithium intercalation electrode." An electrode comprising an electroactive material that is capable of participating in a lithium conversion reaction is referred to as a "lithium conversion electrode." In some embodiments, the electrode comprising the lithium-ion-conductive layer integrated with the electroactive material layer is a cathode. A cathode for use in a lithium-ion electrochemical cell generally refers to an electrode from which a lithium ion is liberated during charge and into which the lithium ion is integrated (e.g., intercalated, chemically bonded) during discharge.

In some embodiments, the electroactive material of the cathode comprises a lithium intercalation compound (e.g., a compound that is capable of reversibly inserting lithium ions at lattice sites and/or interstitial sites). In certain cases, the electroactive material of the cathode comprises a layered oxide. A layered oxide generally refers to an oxide having a lamellar structure (e.g., a plurality of sheets, or layers, stacked upon each other). Non-limiting examples of suitable layered oxides include lithium cobalt oxide ($LiCoO_2$), lithium nickel oxide ($LiNiO_2$), and lithium manganese oxide ($LiMnO_2$). In some embodiments, the layered oxide is lithium nickel manganese cobalt oxide ($LiNi_xMn_yCo_zO_2$, also referred to as "NMC" or "NCM"). In some such embodiments, the sum of x, y, and z is 1. For example, a non-limiting example of a suitable NMC compound is $LiNi_{1/3}Mn_{1/3}Co_{1/3}O_2$. In some embodiments, the layered oxide is lithium nickel cobalt aluminum oxide ($LiNi_xCo_yAl_zO_2$, also referred to as "NCA"). In some such embodiments, the sum of x, y, and z is 1. For example, a non-limiting example of a suitable NCA compound is $LiNi_{0.8}Co_{0.15}Al_{0.05}O_2$. In certain embodiments, the electroactive material of the cathode is a transition metal polyanion oxide (e.g., a compound comprising a transition metal, an oxygen, and/or an anion having a charge with an absolute value greater than 1). A non-limiting example of a suitable transition metal polyanion oxide is lithium iron phosphate ($LiFePO_4$, also referred to as "LFP"). Another non-limiting example of a suitable transition metal polyanion oxide is lithium manganese iron phosphate ($LiMn_xFe_{1-x}PO_4$, also referred to as "LMFP"). A non-limiting example of a suitable LMFP compound is $LiMn_{0.8}Fe_{0.2}PO_4$. In some embodiments, the electroactive material of the cathode is a spinel (e.g., a compound having the structure $AB_2O_4$, where A can be Li, Mg, Fe, Mn, Zn, Cu, Ni, Ti, or Si, and B can be Al, Fe, Cr, Mn, or V). A non-limiting example of a suitable spinel is lithium manganese oxide ($LiMn_2O_4$, also referred to as "LMO"). Another non-limiting example is lithium manganese nickel oxide ($LiNi_xM_{2-x}O_4$, also referred to as "LMNO"). A non-limiting example of a suitable LMNO compound is $LiNi_{0.5}Mn_{1.5}O_4$. In certain cases, the electroactive material of the cathode comprises $Li_{1.14}Mn_{0.42}Ni_{0.25}Co_{0.29}O_2$ ("HC-MNC"), lithium carbonate ($Li_2CO_3$), lithium carbides (e.g., $Li_2C_2$, $Li_4C$, $Li_6C_2$, $Li_8C_3$, $Li_6C_3$, $Li_4C_3$, $Li_4C_5$), vanadium oxides (e.g., $V_2O_5$, $V_2O_3$, $V_6O_{13}$), and/or vanadium phosphates (e.g., lithium vanadium phosphates, such as $Li_3V_2(PO_4)_3$), or any combination thereof.

In some embodiments, the electroactive material of the cathode comprises a conversion compound. For instance, the cathode may be a lithium conversion electrode/cathode. It has been recognized that a cathode comprising a conversion compound may have a relatively large specific capacity. Without wishing to be bound by a particular theory, a relatively large specific capacity may be achieved by utilizing all possible oxidation states of a compound through a conversion reaction in which more than one electron transfer takes place per transition metal (e.g., compared to 0.1-1 electron transfer in intercalation compounds). Suitable conversion compounds include, but are not limited to, transition metal oxides (e.g., $Co_3O_4$), transition metal hydrides, transition metal sulfides, transition metal nitrides, and transition metal fluorides (e.g., $CuF_2$, $FeF_2$, $FeF_3$). A transition metal generally refers to an element whose atom has a partially filled d sub-shell (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs).

In some cases, the electroactive material of the cathode may be doped with one or more dopants to alter the electrical properties (e.g., electrical conductivity) of the electroactive material. Non-limiting examples of suitable dopants include aluminum, niobium, silver, and zirconium.

In some embodiments, the electrode comprising the lithium-ion-conductive layer integrated with the electroactive material layer is an anode.

Figure 2:
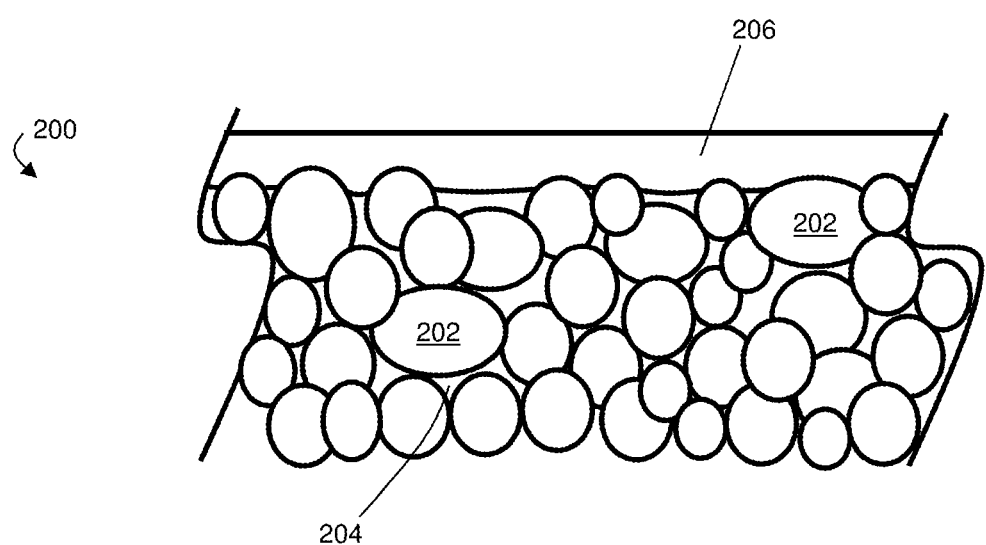
FIG. 2 is a cross-sectional schematic illustration of an electrode, according to some embodiments.

In some cases, the electroactive-material-containing layer, which may have a lithium-ion-conductive layer associated therewith, may comprise a plurality of particles of the electroactive material. FIG. 2 is a cross-sectional schematic illustration of exemplary electrode 200, according to certain embodiments. In FIG. 2, electrode 200 comprises lithium-ion-conductive layer 206 and plurality of particles 202 comprising an electroactive material. In certain embodiments, such as the embodiment illustrated in FIG. 2, pores 204 may form in the interstices between particles 202. In some embodiments, at least a portion of the plurality of particles have a coating (e.g., to prevent dissolution of the active material). The coating may be electronically conductive. Non-limiting examples of suitable materials for the coating include carbon and carbon-containing materials. To form the electrode, the plurality of particles comprising the electroactive material may be combined with a binder and one or more additives to form a mixture (e.g., a slurry). The mixture may then be coated on a substrate and/or a current collector and subsequently dried. In certain embodiments, the binder comprises one or more polymers (e.g., styrene butadiene copolymer, polyvinylidene fluoride (PVDF)). In some cases, additives may be selected to enhance the performance of the electrode. For example, an additive may increase electronic conductivity. Examples of suitable additives include, but are not limited to, carbon-containing materials such as carbon black.

In one particular set of embodiments, and as shown illustratively in FIG. 2, lithium-ion-conductive layer 206 forms a layer on one side or surface (e.g., a single side or surface) of the layer comprising the particles of electroactive material (i.e., the electroactive layer). That is, the inorganic lithium-ion-conductive layer may be disposed on a side or surface of the layer comprising the electroactive material. The lithium-ion-conductive layer may coat (form a coating) a side or surface of the electroactive layer. In some such embodiments, the lithium-ion-conductive layer may be integrated with a side or surface of the electroactive layer. The lithium-ion-conductive material may be absent from the solid interior portions and/or the opposing side/surface of the electroactive layer. In such embodiments, a portion (e.g., the portion of the particles of the electroactive material at the surface of the layer), but not all of the particles of the electroactive material, are coated with the lithium-ion-conductive material/layer. For example, in some cases, at least a portion (e.g., at least 10%, at least 20%, at least 30%, at least 40%, at least 50%, at least 60%, at least 70%, at least 80%, at least 90%, and/or less than 100%, less than or equal to 95%, less than or equal to 90%, e.g., by weight) of the particles of electroactive material in the electroactive layer (e.g., the particles on the opposing side/surface of the electroactive layer and/or the particles in the interior of the layer) are uncoated with the lithium-ion-conductive material (a coating of lithium-ion-conductive material may be absent from such particles). In other embodiments, a second lithium-ion-conductive layer may be formed on the opposing side or surface of the layer comprising the particles of electroactive material. Similar to the embodiment involving a single layer of lithium-ion-conductive material, the lithium-ion-conductive material may be absent from the solid, interior portions of the electroactive layer. These embodiments may be formed by, for example, forming the electroactive layer (e.g., from a slurry of the electroactive particles or by another suitable process), followed by depositing the lithium-ion-conductive layer on the electroactive layer after the electroactive layer has been formed. Such a method contrasts with coating individual electroactive particles of electroactive material prior to the particles forming the electroactive layer.

The particles comprising the electroactive material may be of any suitable shape or size. For example, the particles may be spherical, ellipsoidal, cylindrical, or prismatic (e.g., a triangular prism, a rectangular prism, etc.), or may have an irregular shape. In some embodiments, the plurality of particles has a mean maximum cross-sectional dimension of about 50 µm or less, about 25 µm or less, about 20 µm or less, about 15 µm or less, about 10 µm or less, about 5 µm or less, about 1 µm or less, about 500 nm or less, about 200 nm or less, about 100 nm or less, about 90 nm or less, about 80 nm or less, about 70 nm or less, about 60 nm or less, about 50 nm or less, about 40 nm or less, about 30 nm or less, about 20 nm or less, about 10 nm or less, about 5 nm or less, or about 1 nm. In some embodiments, the plurality of particles has a mean maximum cross-sectional dimension of at least about 1 nm, at least about 5 nm, at least about 10 nm, at least about 20 nm, at least about 30 nm, at least about 40 nm, at least about 50 nm, at least about 60 nm, at least about 70 nm, at least about 80 nm, at least about 90 nm, at least about 100 nm, at least about 200 nm, at least about 500 nm, at least about 1 µm, at least about 5 µm, at least about 10 µm, at least about 15 µm, at least about 20 µm, at least about 25 µm, or at least about 50 µm. Combinations of the above-noted ranges are also possible. The mean maximum cross-sectional dimension may be determined using SEM and/or EDS analysis, as described above.

In some cases, the layer comprising the electroactive material may be porous (e.g., the layer may comprise a plurality of pores). It should be understood that, in cases where the electroactive-material-containing layer comprises an agglomeration of particles, pores include both the inter-particle pores (i.e., those pores defined between particles when they are packed together, e.g. interstices) and intraparticle pores (i.e., those pores lying within the envelopes of the individual particles).

The porous electroactive-material-containing layer may have any suitable porosity. For example, the porous electroactive-material-containing layer may have a porosity of up to about 10%, up to about 15%, up to about 20%, up to about 25%, up to about 30%, up to about 40%, up to about 50%, up to about 60%, or up to about 70% (where the percentages indicate void volume within the porous electroactive-material-containing layer). In some embodiments, the porous electroactive-material-containing layer has a porosity of at least about 10% by volume, at least about 15% by volume, at least about 20% by volume, at least about 25% by volume, at least about 30% by volume, at least about 40% by volume, at least about 50% by volume, at least about 60% by volume, or at least about 70% by volume. Combinations of the above-noted ranges are also possible.

The pores of the electroactive-material-containing layer may have any suitable size and shape. The pores may comprise any suitable cross-sectional shape such as, for example, circular, elliptical, polygonal (e.g., rectangular, triangular, etc.), irregular, and the like. In some cases, the porous electroactive-material-containing layer may have an average pore size of less than about 300 micrometers, for example, less than about 100 micrometers, between about 0.5 micrometer and about 300 micrometers, between about 50 micrometers and about 200 micrometers, or between about 100 micrometers and about 200 micrometers. In some embodiments, some or all of the porosity can be filled by electrolyte. In some cases, at least some of the pores of the electroactive-material-containing layer are filled with an electrolyte that is a liquid, a gel, a solid polymer, and/or a solid inorganic compound. As described above, one of ordinary skill in the art would be capable of calculating the pore size distribution and the average pore size of the plurality of pores within a layer using mercury intrusion porosimetry and/or BET surface analysis.

In some embodiments, the porous electroactive-material-containing layer may comprise pores with relatively uniform maximum cross-sectional dimensions (e.g., diameters). Not wishing to be bound by any theory, such uniformity may be useful in maintaining relatively consistent structural stability throughout the bulk of the porous layer. In addition, the ability to control the pore size to within a relatively narrow range can allow one to incorporate a large number of pores that are large enough to allow for fluid penetration (e.g., electrolyte penetration) while maintaining sufficiently small pores to preserve structural stability of the porous electroactive-material-containing layer. In some embodiments, the distribution of pore sizes within the porous electroactive-material-containing layer can have a standard deviation of less than about 50%, less than about 25%, less than about 10%, less than about 5%, less than about 2%, or less than about 1% of the mean maximum cross-sectional dimension of the plurality of pores.

In other embodiments, an electroactive material layer described herein, which may have a lithium-ion-conductive layer associated therewith, is substantially non-porous.

Figure 3A:
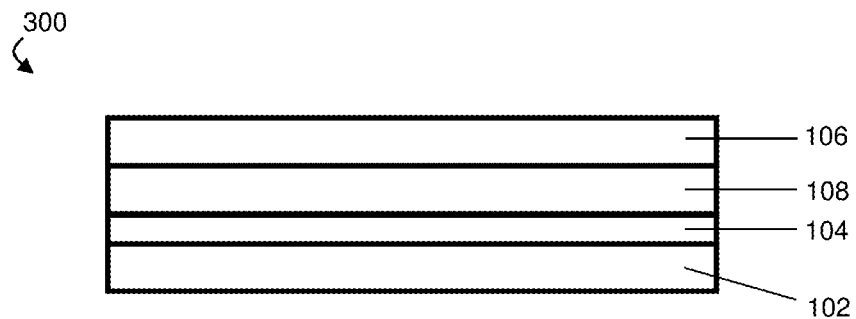
FIGS. 3A-3B are cross-sectional schematic illustrations of an electrochemical cell, according to some embodiments, comprising: (A) a lithium-ion-conductive layer integrated with a first electroactive-material-containing layer; and (B)

Certain embodiments are directed to an electrochemical cell. FIG. 3A shows an exemplary cross-sectional schematic illustration of electrochemical cell 300 comprising cathode 102, anode 106, separator 108 positioned between cathode 102 and anode 106, and lithium-ion-conductive layer 104 positioned between cathode 102 and separator 108. In certain cases, lithium-ion-conductive layer 104 is positioned adjacent cathode 102. As shown in FIG. 3A, lithium-ion-conductive layer 104 may be in direct physical contact with cathode 102. In some cases, lithium-ion-conductive layer 104 is integrated with cathode 102.

Figure 3B:
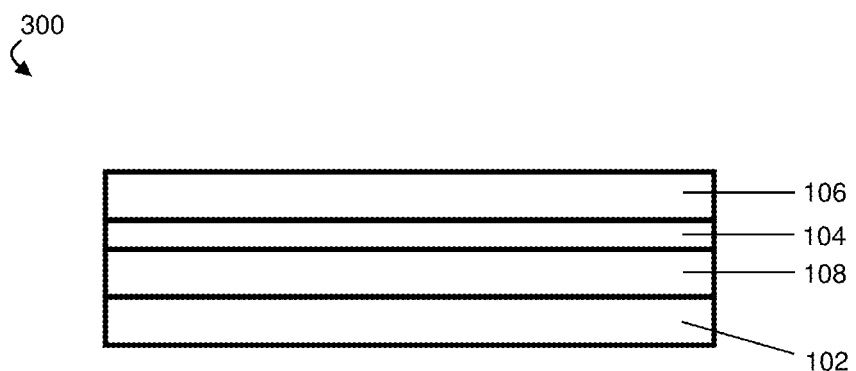

In some embodiments, the lithium-ion-conductive layer can be positioned adjacent the anode. For example, in certain cases, including the embodiment illustrated in FIG. 3B, lithium-ion-conductive layer 104 is positioned adjacent anode 106. As shown in FIG. 3B, lithium-ion-conductive layer 104 may be in direct physical contact with anode 106. In some embodiments, lithium-ion-conductive layer 104 is integrated with anode 106.

In some embodiments, an electrochemical cell may comprise a first lithium-ion-conductive layer integrated with a cathode and a second lithium-ion-conductive layer integrated with an anode. FIG. 4 shows an exemplary cross-sectional schematic illustration of electrochemical cell 400 comprising cathode 102 integrated with first lithium-ion-conductive layer 104 and anode 106 integrated with second lithium-ion-conductive layer 110. As shown in FIG. 4, separator layer 108 is positioned between first lithium-ion-conductive layer 104 and second lithium-ion-conductive layer 110. In certain embodiments, first lithium-ion-conductive layer 104 and second lithium-ion-conductive layer 110 may comprise the same material (e.g., ceramic material). In some cases, first lithium-ion-conductive layer 104 and second lithium-ion-conductive layer 110 may comprise different materials (e.g., a first ceramic material and a second, different ceramic material).

In some embodiments, the electrochemical cell further comprises additional components, such as an electrolyte, one or more substrates, and/or one or more current collectors. FIG. 5 shows an exemplary cross-sectional schematic illustration of electrochemical cell 500 comprising cathode 102, lithium-ion-conductive layer 104, anode 106, separator 108, first substrate and/or current collector 112, and second substrate and/or current collector 114. As shown in FIG. 5, electrochemical cell 500 may comprise a separator 108 positioned between cathode 102 and anode 106. In some cases, separator 108 may comprise an electrolyte, as discussed in further detail below. As shown in FIG. 5, in some cases, lithium-ion-conductive layer 104 is positioned between cathode 102 and separator/electrolyte 108. In some cases, lithium-ion-conductive layer 104 is positioned between anode 102 and separator/electrolyte 108. In some cases, electrochemical cell 500 further comprises first substrate 112. First substrate 112 may be positioned adjacent to cathode 102. As shown in FIG. 5, in some embodiments, substrate 112 is in direct physical contact with cathode 102. In some embodiments, one or more intervening layers may be positioned between substrate 112 and cathode 102. In certain cases, substrate 112 may comprise a metal (e.g., aluminum), and substrate 112 may act as a current collector for cathode 102. In some embodiments, electrochemical cell further comprises second substrate 114. As shown in FIG. 5, in some embodiments, second substrate 114 is in direct physical contact with anode 106. In certain cases, second substrate 114 may comprise a metal (e.g., copper), and second substrate 114 may act as a current collector for anode 106. In some embodiments, one or more intervening layers may be positioned between second substrate 114 and anode 106.

In some embodiments, an electrochemical cell comprises an electrolyte, a separator, first and second substrates and/or current collectors, a first lithium-ion-conductive layer integrated with a cathode, and a second lithium-ion-conductive layer integrated with an anode. FIG. 6 shows an exemplary cross-sectional schematic illustration of electrochemical cell 600 comprising cathode 102, first lithium-ion-conductive layer 104, anode 106, second lithium-ion-conductive layer 110, separator 108, first substrate and/or current collector 112, and second substrate and/or current collector 114. As shown in FIG. 6, second lithium-ion-conductive layer 110, which is integrated with anode 106, is positioned between anode 106 and separator 108.

The electrolyte of an electrochemical cell is generally positioned between the anode and the cathode, providing an ionic path between the anode and the cathode (e.g., the electrolyte is generally capable of conducting lithium ions).

The electrolyte may comprise any liquid, solid, or gel material capable of storing and transporting lithium ions. Generally, the electrolyte is electronically non-conductive to prevent short circuiting between the anode and the cathode.

Any suitable anode can be included in an electrochemical cell described herein. In some embodiments, the anode is an electrode from which a lithium ion is liberated during discharge and into which the lithium ion is integrated (e.g., intercalated) during charge. In some embodiments, the electroactive material of the anode is a lithium intercalation compound (e.g., a compound that is capable of reversibly inserting lithium ions at lattice sites and/or interstitial sites). In some embodiments, the electroactive material of the anode comprises carbon. In certain cases, the electroactive material of the anode is or comprises a graphitic material (e.g., graphite). A graphitic material generally refers to a material that comprises a plurality of layers of graphene (e.g., layers comprising carbon atoms arranged in a hexagonal lattice). Adjacent graphene layers are typically attracted to each other via van der Waals forces, although covalent bonds may be present between one or more sheets in some cases. In some cases, the carbon-comprising electroactive material of the anode is or comprises coke (e.g., petroleum coke). In certain embodiments, the electroactive material of the anode comprises silicon, lithium, and/or any alloys of combinations thereof. In certain embodiments, the electroactive material of the anode comprises lithium titanate ($Li_4Ti_5O_{12}$, also referred to as "LTO"), tin-cobalt oxide, or any combinations thereof.

In some embodiments, the anode (e.g., a first electrode, a second electrode) comprises lithium (e.g., lithium metal), such as lithium foil, lithium deposited onto a conductive substrate, and lithium alloys (e.g., lithium-aluminum alloys and lithium-tin alloys). Lithium can be contained as one film or as several films, optionally separated by a protective structure/material such as a ceramic material or an ion conductive material described herein. Suitable lithium alloys for use in the aspects described herein can include alloys of lithium and aluminum, magnesium, silicium (silicon), indium, and/or tin.

A protective structure (e.g., for anode) may include a protective layer such as an ion conductive layer, which may help to inhibit a species in the electrolyte from contacting the electroactive material of the anode. In some embodiments, the ion-conductive material may be selected to be conductive to particular ions such as metal ions. The ion-conductive material may be conductive to lithium ions or other alkali metal ions, according to some embodiments. In some cases, the ion-conductive material may comprise an inorganic material such as a ceramic and/or a glass conductive to metal ions. Suitable glasses include, but are not limited to, those that may be characterized as containing a "modifier" portion and a "network" portion, as known in the art. The modifier may include a metal oxide of the metal ion conductive in the glass. The network portion may include a metal chalcogenide such as, for example, a metal oxide or sulfide. In other cases, the ion-conductive material may comprise or be a polymeric material. Combinations of ion conductive materials and ion conductive material layers within a protective structure are also possible (e.g., a first ion conductive layer that comprises a ceramic and a second ion conductive layer that comprises a polymer). The protective layer for the anode may be substantially impermeable (e.g., to the electrolyte used with the electrochemical cell including the anode).

In some embodiments, the ion-conductive material may comprise a material selected from the group consisting of lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, LiO, $LiO_2$, $LiRO_2$, where R is a rare earth metal), lithium lanthanum oxides, lithium titanium oxides, lithium borosulfides, lithium aluminosulfides, and lithium phosphosulfides, oxysulfides, and combinations thereof. In some embodiments, the ion-conductive material may comprise $Al_2O_3$, $ZrO_2$, $SiO_2$, $CeO_2$, and/or $Al_2TiO_5$. The selection of the ion-conductive material will be dependent on a number of factors including, but not limited to, the properties of electrolyte and the anode and cathode used in the cell.

Examples of classes of polymers that may be suitable for use in a protective structure (e.g., as a polymer layer) include, but are not limited to, polyamines (e.g., poly (ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from the group consisting of polyvinyl alcohol, polyisobutylene, epoxy, polyethylene, polypropylene, polytetrafluoroethylene, and combinations thereof. The mechanical and electronic properties (e.g., conductivity, resistivity) of these polymers are known.

Other suitable materials and/or properties of the protective layer are described in U.S. Patent Publication No. 2010/0327811, filed Jul. 1, 2010 and published Dec. 30, 2010, entitled "Electrode Protection in Both Aqueous and Non-Aqueous Electromechanical Cells, Including Rechargeable Lithium Batteries," which is incorporated herein by reference in its entirety for all purposes.

In certain embodiments, at least a portion of the anode and/or a portion of the cathode are in direct physical contact with the electrolyte. In certain embodiments, at least a portion of the electroactive material of the anode and/or a portion of the electroactive material of the cathode are in direct physical contact with the electrolyte. For example, the electrolyte may be in contact with the electroactive material of the anode and/or the electroactive material of the cathode to facilitate transport of Li ions across the electrode in the electrochemical cell. For example, in some embodiments the electrolyte resides in pores or interstices of the electrode. In some embodiments, the electrolyte can be in direct physical contact with a lithium species of an electrode. In some embodiments, the electrolyte is in contact (e.g., direct physical contact) with two or more sides of the anode and/or the cathode. According to certain embodiments, for example, the electrolyte may be a liquid that surrounds two or more sides of the anode and/or the cathode. In some embodiments, the electrochemical cell is a pouch cell, and the anode and cathode are positioned within a pouch filled with an electrolyte (e.g., a liquid electrolyte) that surrounds two or more sides of the anode and/or cathode.

In certain embodiments, at least a portion of one electrode (e.g., a cathode) but not a second electrode (e.g., an anode) is in direct physical contact with the electrolyte. For example, the second electrode (e.g., anode) may include a protective layer (e.g. a substantially impermeable layer) that substantially inhibits direct contact of the electrode with the electrolyte. The protective layer may be in direct physical contact with the electrolyte instead of the electroactive material of the electrode, though minor imperfections (e.g., defects) in the protective layer may cause indirect contact of the electrolyte with the electroactive material (e.g., via the protective layer) in some embodiments.

In certain embodiments, the electrolyte comprises an organic solvent. Examples of suitable organic solvents include, but are not limited to, dimethyl carbonate, diethyl carbonate, ethyl-methyl carbonate, ethylene carbonate, and propylene carbonate. In some embodiments, the electrolyte comprises one or more solid polymers. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing. In some cases, the electrolyte further comprises a lithium salt. Non-limiting examples of suitable lithium salts include lithium hexafluorophosphate (LiPF$_6$), lithium tetrafluoroborate (LiBF$_4$), lithium perchlorate (LiClO$_4$), lithium hexafluoroarsenate monohydrate (LiAsF$_6$), lithium triflate (LiCF$_3$SO$_3$), LiN(SO$_2$CF$_3$)$_2$, and LiC(SO$_2$(CF$_3$)$_3$.

In some embodiments, the electrolyte has a relatively high lithium ion conductivity. In some embodiments, the electrolyte has a lithium ion conductivity of at least about $10^{-5}$ S/cm, at least about $10^{-4}$ S/cm, at least about $10^{-3}$ S/cm, at least about $10^{-2}$ S/cm, at least about $10^{-1}$ S/cm, or at least about 1 S/cm. In some embodiments, the electrolyte has a lithium ion conductivity in the range of about $10^{-5}$ S/cm to about $10^{-4}$ S/cm, about $10^{-5}$ S/cm to about $10^{-3}$ S/cm, about $10^{-5}$ S/cm to about $10^{-2}$ S/cm, about $10^{-5}$ S/cm to about $10^{-1}$ S/cm, about $10^{-5}$ S/cm to about 1 S/cm, about $10^{-4}$ S/cm to about $10^{-3}$ S/cm, about $10^{-4}$ S/cm to about $10^{-2}$ S/cm, about $10^{-4}$ S/cm to about $10^{-1}$ S/cm, about $10^{-4}$ S/cm to about 1 S/cm, about $10^{-3}$ S/cm to about $10^{-2}$ S/cm, about $10^{-3}$ S/cm to about $10^{-1}$ S/cm, about $10^{-3}$ S/cm to about 1 S/cm, about $10^{-2}$ S/cm to about $10^{-1}$ S/cm, about $10^{-2}$ S/cm to about 1 S/cm, or about $10^{-1}$ S/cm to about 1 S/cm. The lithium ion conductivity of the electrolyte may be measured using EIS, as described above.

In certain cases, the electrolyte may optionally further comprise additives. The additives may, for example, reduce impedance of the anode and/or cathode, and/or promote the formation of films. Non-limiting examples of suitable additives include vinylene carbonate, vinyl ethylene carbonate, CO$_2$, SO$_2$, ethylene sulfite, and any combination thereof.

The separator of an electrochemical cell (e.g., separator 108 of electrochemical cell 400 in FIG. 4) is generally positioned between the anode and the cathode. The separator may be a solid non-electronically conductive or electrically insulating material. In some cases, the separator may separate or insulate the anode and the cathode from each other, preventing short circuiting, while permitting the transport of ions between the anode and the cathode. In some embodiments, the separator may be porous (e.g., the separator may comprise a plurality of pores). In certain cases, the porous separator may be permeable to the electrolyte.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes (e.g., SETELA™ made by Tonen Chemical Corp) and polypropylenes, glass fiber filter papers, and ceramic materials. For example, in some embodiments, the separator comprises a microporous polyethylene film. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee. Solid electrolytes and gel electrolytes may also function as a separator in addition to their electrolyte function.

Examples of suitable separator materials include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), and combinations thereof.

The electrochemical cell may have any suitable shape. In some cases, the electrochemical cell is cylindrical (e.g., a sandwich of cathode, separator, and anode rolled into a single spool). In certain cases, the electrochemical cell is prismatic. In some embodiments, the electrochemical cell is a pouch cell. For example, the anode and cathode of the electrochemical cell may be sealed within a pouch formed from a polymer film, and the pouch may be filled with an electrolyte (e.g., a liquid electrolyte). Metal tabs (e.g., Ni, Al) may be attached to the anode and cathode for electrical connection to an external electrical circuit.

A typical electrochemical cell also would include, of course, current collectors, external circuitry, a housing structure, and the like. Those of ordinary skill in the art are well aware of the many arrangements that can be utilized with the general schematic arrangement as shown in the figures and described herein.

As noted elsewhere, the energy storage devices described herein may be capable of achieving enhanced performance. For example, certain of the electrochemical cells incorporating lithium-ion-conductive layers may have reduced capacity fade rate (e.g., loss of capacity per cycle) relative to electrochemical cells lacking such lithium-ion-conductive layers but otherwise including the same components. In some embodiments, the electrochemical cell capacity decreases by less than about 5% per charge and discharge cycle, less than about 2% per charge and discharge cycle, less than about 1% per charge and discharge cycle, less than about 0.8% per charge and discharge cycle, less than about 0.6% per charge and discharge cycle, less than about 0.4% per charge and discharge cycle, less than about 0.2% per charge and discharge cycle, or less than about 0.1% per charge and discharge cycle over at least about 2, at least about 10, at least about 20, at least about 30, at least about 50, at least about 75, at least about 100, at least about 125, or at least about 135 cycles subsequent to a first charge and discharge cycle at a temperature of at least about 25° C., at least about 40° C., or at least about 60° C. In some embodiments, the electrochemical cell capacity decreases by more than about 0.1% per charge and discharge cycle, more than about 0.2% per charge and discharge cycle, more than about 0.4% per charge and discharge cycle, more than about 0.6% per charge and discharge cycle, more than about 0.8% per charge and discharge cycle, more than about 1% per charge and discharge cycle, more than about 2% per charge and discharge cycle, or more than about 5% per charge and discharge cycle. Combinations of the above-noted ranges are also possible. Capacity fade rate may be determined by measuring capacity during each cycle of charge and discharge.

In some embodiments, an electrochemical cell comprising a lithium-ion-conductive layer may exhibit a capacity fade rate that is at least about 1%, at least about 5%, at least about 10%, at least about 20%, at least about 50%, at least about 75%, or at least about 100% lower than the capacity fade rate of an equivalent electrochemical cell that does not comprise a lithium-ion-conductive layer but otherwise includes the same components.

In some embodiments, the electrochemical cells described herein may exhibit relatively high capacities after repeated cycling of the cell. For example, in some embodiments, after alternately discharging and charging the cell five times, the cell exhibits at least about 50%, at least about 80%, at least about 90%, or at least about 95% of the cell's initial capacity at the end of the fifth cycle. In some cases, after alternately discharging and charging the cell ten times, the cell exhibits at least about 50%, at least about 80%, at least about 90%, or at least about 95% of the cell's initial capacity at the end of the tenth cycle. In still further cases, after alternately discharging and charging the cell twenty-five times, the cell exhibits at least about 50%, at least about 80%, at least about 90%, or at least about 95% of the cell's initial capacity at the end of the twenty-fifth cycle.

Some lithium-ion electrochemical cells may be susceptible to self-discharge (e.g., discharge of the electrochemical cell (e.g., loss of capacity during storage of the electrochemical cell). In some cases, the rate of self-discharge of certain of the electrochemical cells described herein may be reduced relative to electrochemical cells lacking lithium-ion-conductive layers but otherwise including the same components. In certain cases, the self-discharge rate of the electrochemical cell may be about 90% or less, about 80% or less, about 70% or less, about 60% or less, about 50% or less, about 40% or less, about 30% or less, about 20% or less, or about 10% or less per week at 60° C. In certain embodiments, the self-discharge rate of the electrochemical cell may be about 10% or more, about 20% or more, about 30% or more, about 40% or more, about 50% or more, about 60% or more, about 70% or more, about 80% or more, or about 90% or more per week at 60° C. In some embodiments, the self-discharge rate of the electrochemical cell may be about 90% or less, about 80% or less, about 70% or less, about 60% or less, about 50% or less, about 40% or less, about 30% or less, about 20% or less, or about 10% or less per week at room temperature (e.g., about 25° C.). In some cases, the self-discharge rate of the electrochemical cell may be about 10% or more, about 20% or more, about 30% or more, about 40% or more, about 50% or more, about 60% or more, about 70% or more, about 80% or more, or about 90% or more per week at room temperature (e.g., about 25° C.). Combinations of the above-noted ranges are also possible.

In some embodiments, an electrochemical cell comprising a lithium-ion-conductive layer may exhibit a self-discharge rate that is at least about 1%, at least about 5%, at least about 10%, at least about 20%, at least about 50%, at least about 75%, or at least about 100% lower than the self-discharge rate of an equivalent electrochemical cell that does not comprise a lithium-ion-conductive layer but otherwise includes the same components. Correspondingly, in certain cases, an electrochemical cell comprising a lithium-ionconductive layer may exhibit a self-discharge rate that is less than about 100%, less than about 75%, less than about 50%, less than about 20%, less than about 20%, less than about 10%, less than about 5%, or less than about 1% lower than the self-discharge rate of an equivalent electrochemical cell that does not comprise a lithium-ion-conductive layer but otherwise includes the same components. Combinations of the above-noted ranges are also possible.

In certain embodiments, an electrochemical cell comprising a lithium-ion-conductive layer may experience a reduction in irreversible capacity loss during storage and/or after the initial discharge after storage. In some embodiments, the electrochemical cell may experience a reduction in irreversible capacity loss upon subsequent discharges as well (e.g., after recharging at room temperature or elevated temperatures such as 50 degrees Celsius, or other elevated temperatures described herein). For example, the electrochemical cell may experience a reduction in irreversible capacity loss or at least 5%, at least 10%, at least 20%, at least 30%, at least 40%, or at least 50% during storage, after initial discharge, or after the $2^{nd}$, $3^{rd}$, $4^{th}$, $5^{th}$, $6^{th}$, $7^{th}$, $8^{th}$, $9^{th}$, or $10^{th}$ discharge of the electrochemical cell compared to that performed using a similar electrochemical cell including similar components and amounts, but without the lithium-ion-conductive layer (i.e., all other factors being equal). In some embodiments, the reduction in irreversible capacity loss may be less than or equal to 80%, less than or equal to 60%, less than or equal to 40%, less than or equal to 20%, or less than or equal, to 10% during storage, after initial discharge, or after the $2^{nd}$, $3^{rd}$, $4^{th}$, $5^{th}$, $6^{th}$, $7^{th}$, $8^{th}$, $9^{th}$, or $10^{th}$ discharge of the electrochemical cell compared to that performed using a similar electrochemical cell but without the lithium-ion-conductive layer, all other factors being equal. Combinations of the above-referenced ranges are also possible.

In certain embodiments, an electrochemical cell comprising a lithium-ion-conductive layer may experience a reduced rate of impedance increase relative to electrochemical cells that do not comprise a lithium-ion-conductive layer but otherwise include the same components in the same amounts (i.e., all other factors being equal). In some embodiments, an electrochemical cell comprising a lithium-ion-conductive layer may have a rate of impedance increase that is at least about 1%, at least about 5%, at least about 10%, at least about 20%, at least about 50%, at least about 75%, or at least about 100% lower than the rate of impedance increase of an equivalent electrochemical cell that does not comprise a lithium-ion-conductive layer but otherwise includes the same components. In certain cases, an electrochemical cell comprising a lithium-ion-conductive layer may have a rate of impedance increase that is less than about 100%, less than about 75%, less than about 50%, less than about 20%, less than about 20%, less than about 10%, less than about 5%, or less than about 1% lower than the rate of impedance increase of an equivalent electrochemical cell that does not comprise a lithium-ion-conductive layer but otherwise includes the same components. Combinations of the above-noted ranges are also possible.

In certain embodiments in which an electrochemical cell comprises a first electrode (e.g., a lithium-intercalation electrode) comprising a lithium-ion-conductive layer, a second electrode (e.g., an intercalation electrode, a lithium metal electrode), and an electrolyte, no species decomposed from the first electrode or the electrolyte resides at the second electrode after the electrochemical cell has undergone at least about 10 cycles, at least about 25 cycles, at least about 50 cycles, at least about 75 cycles, at least about 100 cycles, at least about 125 cycles, at least about 150 cycles, at least about 175 cycles, at least about 200 cycles, at least about 250 cycles, or at least about 300 cycles. In some embodiments, no species decomposed from the first electrode or the electrolyte resides at the second electrode after the electrochemical cell has undergone less than or equal to about 300 cycles, less than or equal to about 250 cycles, less than or equal to about 200 cycles, less than or equal to about 175 cycles, less than or equal to about 150 cycles, less than or equal to about 125 cycles, less than or equal to about 100 cycles, less than or equal to about 75 cycles, less than or equal to about 50 cycles, less than or equal to about 25 cycles, or less than or equal to about 10 cycles. Combinations of the above-noted ranges are also possible. Species residing at the second electrode may be detected, for example, through energy dispersive spectroscopy (EDS).

Some embodiments may include electrochemical devices in which the application of an anisotropic force is used to enhance the performance of the device. Application of force to the electrochemical cell may improve the cycling lifetime and performance of the cell. Any of the electrode properties (e.g., porosities, average pore size, etc.) and/or performance metrics outlined above may be achieved, alone or in combination with each other, while an anisotropic force is applied to the electrochemical cell (e.g., during charge and/or discharge of the cell). The magnitude of the anisotropic force may lie within any of the ranges mentioned below.

In some embodiments, the anisotropic force applied to the energy storage device comprises a component normal to the active surface of an electrode of the energy storage device (e.g., the anode of a lithium-ion electrochemical cell). In the case of a planar surface, the force may comprise an anisotropic force with a component normal to the surface at the point at which the force is applied. In the case of a curved surface, for example, a concave surface or a convex surface, the force may comprise an anisotropic force with a component normal to a plane that is tangent to the curved surface at the point at which the force is applied. In some embodiments, an anisotropic force with a component normal to the active surface of the anode is applied during at least one period of time during charge and/or discharge of the electrochemical cell. In some embodiments, the force may be applied continuously, over one period of time, or over multiple periods of time that may vary in duration and/or frequency. The anisotropic force may be applied, in some cases, at one or more pre-determined locations, optionally distributed over the active surface of one or both electrodes. In some embodiments, the anisotropic force is applied uniformly over the active surface of an electrode.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes a force applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis. A force with a "component normal" to a surface, for example an active surface of an electrode, is given its ordinary meaning as would be understood by those of ordinary skill in the art and includes, for example, a force which at least in part exerts itself in a direction substantially perpendicular to the surface.

In some embodiments, an anisotropic force with a component normal to the active surface of an electrode (e.g., a cathode) is applied, during at least one period of time during charge and/or discharge of the electrochemical cell. The component of the anisotropic force normal to the electrode active surface may, for example, define a pressure of at least about 5, at least about 10, at least about 25, at least about 50, at least about 75, at least about 100, at least about 120, at least about 150, at least about 175, at least about 200, at least about 225, or at least about 250 Newtons per square centimeter. In some embodiments, the component of the anisotropic force normal to the electrode active surface may, for example, define a pressure of less than about 250, less than about 225, less than about 200, less than about 150, less than about 120, less than about 100, less than about 50, less than about 25, or less than about 10 Newtons per square centimeter. In some cases, the component of the anisotropic force normal to the anode active surface is may define a pressure of between about 5 and about 150 Newtons per square centimeter, between about 50 and about 120 Newtons per square centimeter, between about 70 and about 100 Newtons per square centimeter, between about 80 and about 110 Newtons per square centimeter, between about 5 and about 250 Newtons per square centimeter, between about 50 and about 250 Newtons per square centimeter, between about 80 and about 250 Newtons per square centimeter, between about 90 and about 250 Newtons per square centimeter, or between about 100 and about 250 Newtons per square centimeter. While forces and pressures are generally described herein in units of Newtons and Newtons per unit area, respectively, forces and pressures can also be expressed in units of kilograms-force and kilograms-force per unit area, respectively. One of ordinary skill in the art will be familiar with kilogram-force-based units, and will understand that 1 kilogram-force (kgf) is equivalent to about 9.8 Newtons.

Some embodiments relate to methods involving one or more components described herein. In some embodiments, a method comprises cycling an electrochemical cell comprising a first electrode (e.g., a lithium intercalation electrode, a lithium conversion electrode), a second electrode, and an electrolyte. According to certain embodiments, the first electrode comprises a layer comprising an electroactive material integrated with an inorganic lithium-ion-conductive layer. Certain advantages described herein (e.g., increased cycle life, reducing electrolyte loss, inhibition of certain species from residing at an electrode) may be achieved during such cycling.

In some embodiments, the method comprises cycling the electrochemical cell at a temperature of at least about 20 degrees Celsius, at least about 25 degrees Celsius, at least about 30 degrees Celsius, at least about 35 degrees Celsius, at least about 40 degrees Celsius, at least about 45 degrees Celsius, at least about 50 degrees Celsius, at least about 55 degrees Celsius, or at least about 60 degrees Celsius, at least 65 degrees Celsius. In some embodiments, the method comprises cycling the electrochemical cell at a temperature of less than or equal to about 70 degrees Celsius, less than or equal to about 65 degrees Celsius, less than or equal to about 60 degrees Celsius, less than or equal to about 55 degrees Celsius, less than or equal to about 50 degrees Celsius, less than or equal to about 45 degrees Celsius, less than or equal to about 40 degrees Celsius, less than or equal to about 35 degrees Celsius, less than or equal to about 30 degrees Celsius, less than or equal to about 25 degrees Celsius, or less than or equal to about 20 degrees Celsius. Combinations of the above-referenced ranges are also possible.

In some embodiments, the method comprises cycling the electrochemical cell with an end-of-charge voltage of at least about 4.2 V, at least about 4.3 V, at least about 4.4 V, or at least about 4.5 V, at least about 4.6 V, at least about 4.7 V, at least about 4.8 V, or at least about 4.9 V. In some embodiments, the method comprises cycling the electrochemical cell with an end-of-charge voltage of about 5.0 V or less, about 4.9 V or less, about 4.8 V or less, about 4.7 V or less, about 4.6 V or less, about 4.5 V or less, about 4.4 V or less, about 4.3 V or less, or about 4.2 V or less. Combinations of the above-referenced ranges are also possible.

In certain embodiments, the electrochemical cell is cycled for at least about 10 cycles, at least about 25 cycles, at least about 50 cycles, at least about 75 cycles, at least about 100 cycles, at least about 125 cycles, at least about 150 cycles, at least about 175 cycles, at least about 200 cycles, at least about 250 cycles, or at least about 300 cycles. In some embodiments, the electrochemical cell is cycled for less than or equal to about 300 cycles, less than or equal to about 250 cycles, less than or equal to about 200 cycles, less than or equal to about 175 cycles, less than or equal to about 150 cycles, less than or equal to about 125 cycles, less than or equal to about 100 cycles, less than or equal to about 75 cycles, less than or equal to about 50 cycles, less than or equal to about 25 cycles, or less than or equal to about 10 cycles. Combinations of the above-noted ranges are also possible.

In some embodiments, a method comprises substantially inhibiting a species decomposed from the first electrode, or a species decomposed from the electrolyte, from residing at the second electrode. In some embodiments, the method comprises substantially inhibiting the species from depositing on the second electrode.

According to some embodiments, the method comprises inhibiting a species decomposed from the first electrode or from the electrolyte from residing at the second electrode at a temperature of at least about 20 degrees Celsius, at least about 25 degrees Celsius, at least about 30 degrees Celsius, at least about 35 degrees Celsius, at least about 40 degrees Celsius, at least about 45 degrees Celsius, or at least about 50 degrees Celsius. In some embodiments, the method comprises inhibiting a species decomposed from the first electrode or from the electrolyte from residing at the second electrode at a temperature of less than or equal to about 50 degrees Celsius, less than or equal to about 45 degrees Celsius, less than or equal to about 40 degrees Celsius, less than or equal to about 35 degrees Celsius, less than or equal to about 30 degrees Celsius, less than or equal to about 25 degrees Celsius, or less than or equal to about 20 degrees Celsius. Combinations of the above-noted ranges are also possible.

Some embodiments are directed to methods of fabricating electrodes and/or electrochemical cells. In some embodiments, the method comprises the step of depositing a lithium-ion-conductive layer on an electroactive-material-containing layer. The depositing step may be performed using any suitable method, including, but not limited to, electron beam evaporation, chemical vapor deposition (CVD), plasma-enhanced chemical vapor deposition (PECVD), laser-enhanced chemical vapor deposition, thermal evaporation (including, but not limited to, resistive, inductive, radiation, and electron beam heating), aerosol deposition, sputtering (including, but not limited to, diode, DC magnetron, RF, RF magnetron, pulsed, dual magnetron, AC, MF, and reactive), laser ablation, ion plating, cathodic arc, and jet vapor deposition. The technique used may depend on a variety of factors, including the type of material being deposited, the thickness of the layer, and the underlying layer on which the lithium-ion-conductive layer is deposited. For example, aerosol deposition may be utilized to deposit a lithium-ion-conductive layer comprising ceramics having a crystalline structure, such as $Li_{10}GeP_2S_{12}$ and/or $Li_7La_3Zr_2O_{12}$.

In some embodiments, methods described herein further comprise exposing at least a portion of the anode and/or the cathode to the electrolyte. In some embodiments, methods described herein further comprise exposing at least a portion of the electroactive material of the anode and/or the electroactive material of the cathode to the electrolyte.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U. S. Pub. No. 2007-0221265, and entitled "Rechargeable Lithium/Water, Lithium/Air Batteries"; International Patent Apl. Serial No.: PCT/US2008/009158, filed Jul. 29, 2008, published as International Pub. No. WO/2009017726, and entitled "Swelling Inhibition in Lithium Batteries"; U.S. patent application Ser. No. 12/312,764, filed May 26, 2009, published as U.S. Pub. No. 2010-0129699, and entitled "Separation of Electrolytes"; International Patent Apl. Serial No.: PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, published as U.S. Pub. No. 2009-0200986, and entitled "Protective Circuit for Energy-Storage Device"; U.S. patent application Ser. No. 11/400,025, filed Apr. 6, 2006, published as U.S. Pub. No. 2007-0224502, and entitled "Electrode Protection in both Aqueous and Non-Aqueous Electrochemical Cells, including Rechargeable Lithium Batteries"; U.S. patent application Ser. No. 11/821,576, filed Jun. 22, 2007, published as U.S. Pub. No. 2008/0318128, and entitled "Lithium Alloy/Sulfur Batteries"; patent application Ser. No. 11/111,262, filed Apr. 20, 2005, published as U.S. Pub. No. 2006-0238203, and entitled "Lithium Sulfur Rechargeable Battery Fuel Gauge Systems and Methods"; U.S. patent application Ser. No. 11/728,197, filed Mar. 23, 2007, published as U.S. Pub. No. 2008-0187663, and entitled "Co-Flash Evaporation of Polymerizable Monomers and Non-Polymerizable Carrier Solvent/Salt Mixtures/Solutions"; International Patent Apl. Serial No.: PCT/US2008/010894, filed Sep. 19, 2008, published as International Pub. No. WO/2009042071, and entitled "Electrolyte Additives for Lithium Batteries and Related Methods"; International Patent Apl. Serial No.: PCT/US2009/000090, filed Jan. 8, 2009, published as International Pub. No. WO/2009/089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727,862, filed Mar. 19, 2010, entitled "Cathode for Lithium Battery"; U.S. patent application Ser. No. 12/471,095, filed May 22, 2009, entitled "Hermetic Sample Holder and Method for Performing Microanalysis Under Controlled Atmosphere Environment"; U.S. patent application Ser. No. 12/862,513, filed on Aug. 24, 2010, entitled "Release System for Electrochemical cells (which claims priority to Provisional Patent Apl. Ser. No. 61/236,322, filed Aug. 24, 2009, entitled "Release System for Electrochemical Cells"); U.S. patent application Ser. No. 13/216,559, filed on Aug. 24, 2011, published as U.S. Patent Publication No. 2012/0048729, entitled "Electrically Non-Conductive Materials for Electrochemical Cells;" U.S. Provisional Patent Apl. Ser. No. 61/376,554, filed on Aug. 24, 2010, entitled "Electrically Non-Conductive Materials for Electrochemical Cells;" U.S. patent application Ser. No. 12/862,528, filed on Aug. 24, 2010, published as U.S. Patent Publication No. 2011/0177398, entitled "Electrochemical Cell;" U.S. patent application Ser. No. 12/862,563, filed on Aug. 24, 2010, published as U.S. Pub. No. 2011/0070494, entitled "Electrochemical Cells Comprising Porous Structures Comprising Sulfur" [S1583.70029US00]; U.S. patent application Ser. No. 12/862,551, filed on Aug. 24, 2010, published as U.S. Pub. No. 2011/0070491, entitled "Electrochemical Cells Comprising Porous Structures Comprising Sulfur" [S1583.70030US00]; U.S. patent application Ser. No. 12/862,576, filed on Aug. 24, 2010, published as U.S. Pub. No. 2011/0059361, entitled "Electrochemical Cells Comprising Porous Structures Comprising Sulfur" [S1583.70031US00]; U.S. patent application Ser. No. 12/862,581, filed on Aug. 24, 2010, published as U.S. Pub. No. 2011/0076560, entitled "Electrochemical Cells Comprising Porous Structures Comprising Sulfur" [S1583.70024US01]; U.S. patent application Ser. No. 13/240,113, filed on Sep. 22, 2011, published as U.S. Patent Pub. No. 2012/0070746, entitled "Low Electrolyte Electrochemical Cells"; U.S. Patent Apl. Ser. No. 61/385,343, filed on Sep. 22, 2010, entitled "Low Electrolyte Electrochemical Cells"; and U.S. patent application Ser. No. 13/033,419, filed Feb. 23, 2011, published as U.S. Patent Pub. No. 2011/0206992, entitled "Porous Structures for Energy Storage Devices" [S1583.70034US00]; U.S. patent application Ser. No. 13/789,783, filed Mar. 9, 2012, published as U.S. Patent Pub. No. 2013/0252103, and entitled "Porous Support Structures, Electrodes Containing Same, and Associated Methods"; U.S. patent Pub. Ser. No. 13/644,933, filed Oct. 4, 2012, published as U.S. Patent Pub. No. 2013/0095380, and entitled "Electrode Structure and Method for Making the Same" [S1583.70044US01]; U.S. patent application Ser. No. 14/150,156, filed Jan. 8, 2014, and entitled "Conductivity Control in Electrochemical Cells" [S1583.70049US01]; U.S. patent application Ser. No. 13/833,377, filed Mar. 15, 2013, and entitled "Protective Structures for Electrodes" [S1583.70051US00]; U.S. patent application Ser. No. 14/209,274, filed Mar. 13, 2014, published as U.S. Patent Pub. No. 2014/0272597 and entitled "Protected Electrode Structures and Methods" [S1583.70052US01]; U.S. patent application Ser. No. 14/150,196, published as U.S. Patent Pub. No. 2014/0193713, filed Jan. 8, 2014, entitled, "Passivation of Electrodes in Electrochemical Cells" [S1583.70058US01]; U.S. patent application Ser. No. 14/552,608, published as U.S. Patent Apl. No.: 2015/0086837, filed Nov. 25, 2014, entitled "Ceramic/Polymer Matrix for Electrode Protection in Electrochemical Cells, including Rechargeable Lithium Batteries" [S1583.70062US02]; U.S. patent application Ser. No. 14/455,230, published as U.S. Patent Pub. No. 2015/0044517, filed Aug. 8, 2014, and entitled "Self-Healing Electrode Protection in Electrochemical Cells" [51583.70064US01]; U.S. patent application Ser. No. 14/184,037, published as U.S. Patent Pub. No. 2015/0236322, filed Feb. 19, 2014, and entitled, "Electrode Protection Using Electrolyte-Inhibiting Ion Conductor" [S1583.70065US01]. All other patents and patent applications disclosed herein are also incorporated by reference in their entirety for all purposes.

The following examples are intended to illustrate certain embodiments of the present invention, but do not exemplify the full scope of the invention.

Example 1

This example describes the fabrication and testing of electrochemical cells comprising an anode, a cathode coated with a lithium-ion-conductive ceramic, and a porous separator positioned between the anode and the cathode.

In the electrochemical cell, the anode was graphite, and a 10 µm Cu foil acted as a substrate and current collector. The porous separator was a 25 µm-thick layer of polyolefin (Celgard 2325). The cathode was lithium iron phosphate (LFP) coated on an aluminum substrate. The cathode had a capacity of about 1.21 mAh/cm$^2$. Lithium oxide was coated on the LFP cathode by vacuum deposition, in which oxygen-containing gas was reacted with lithium vapor. In both the anode and the cathode, PVDF was used as a binder.

The above components were assembled in a single-layer cell, with the separator positioned between the anode and the cathode, and the cell components were placed in a foil pouch. The total active cathode surface area was 16.574 cm$^2$. 0.3 mL of LP30 electrolyte (44.1% dimethyl carbonate, 44.1% ethylene carbonate, 11.8% lithium hexafluorophosphate) was added to the foil pouch, and the cell package was then vacuum sealed. The cell was allowed to soak with the electrolyte for 24 hours unrestrained, and then 10 kg/cm$^2$ pressure was applied. The cell was cycled under the 10 kg/cm$^2$ pressure.

Charge and discharge cycling was performed at standard C/8 (2.5 mA) and C/5 rates (4 mA), respectively, with a charge cutoff voltage of 4.2 V followed by taper at 4.2 V to 0.5 mA, and a discharge cutoff voltage of 2.5 V. The cell was cycled at room temperature for 5 cycles. From the 6$^{th}$ cycle, the cell was cycled at 50° C.

FIG. 8A shows an SEM image of the cross-sectional view of the lithium oxide-coated LFP cathode before cycling, and FIG. 8B shows an SEM image of the cathode after approximately 70 cycles. From FIGS. 8A-8B, it appears that the lithium oxide ceramic coating remained intact after approximately 70 cycles.

Comparative Example 1

This comparative example describes the fabrication and testing of control cells comprising an uncoated graphite anode and an uncoated LFP cathode. The materials and procedures presented in Example 1 were used and followed, except the LFP cathode was not coated with a lithium-ion-conductive ceramic material.

FIG. 7 shows that the discharge capacity fade rate at 50° C. cycling temperature for the electrochemical cells from Example 1 (702) was considerably improved compared to the rate for the electrochemical cells from Comparative Example 1 (704).

FIGS. 9A-9B show energy-dispersive spectroscopy (EDS) spectra of the graphite anode from an electrochemical cell of Comparative Example 1 (9A) and an electrochemical cell of Example 1 (9B). Although there was no notable difference in morphology between the control cell and ceramic-coated LFP cell, as indicated by SEM (FIG. 8), EDS detected Fe on the graphite anode of the control cell, while Fe was absent on the graphite anode from the ceramic-coated LFP cell. This result suggests lithium oxide inhibited the Fe dissolution from LFP and subsequent reduction on the graphite anode, and therefore improved the capacity fade rate.

Example 2

This example describes the fabrication and testing of electrochemical cells comprising an oxysulfide-coated LFP cathode.

The materials and procedures presented in Example 1 were used and followed, except the LFP cathode was coated with oxysulfide instead of lithium oxide. A 0.5 µm-thick coating of oxysulfide ceramic was sputtered on LFP electrodes. FIG. 10 shows improved discharge capacity fade rate in the cells containing oxysulfide-coated LFP (1000) relative to the control cells of Comparative Example 1 (1020).

Example 3

This example describes the fabrication and testing of electrochemical cells comprising a lithium oxide-coated LFP cathode.

A 2 µm-thick lithium oxide layer was vacuum deposited on LFP electrodes. The cells were built in the same manner as in Example 1 and cycled at room temperature for 5 cycles. The fully charged cells were stored at 60° C. for a week and then cycled at room temperature. The control cells with regular LFP cathodes were built and cycled/stored the same way. As shown in FIG. 11, 100% self-discharge was observed from the control cells of Comparative Example 1 (1120). In the presence of lithium oxide ceramic coating on the LFP cathodes, cell self-discharge was reduced to 56% (1100).

Example 4

This example describes the fabrication and testing of electrochemical cells comprising a lithium oxide-coated anode.

A 2 µm-thick lithium oxide layer was vacuum deposited on graphite electrodes. The cells were built in the same manner as in Example 1 and cycled at room temperature for 5 cycles. The fully charged cells were stored at 60° C. for a week and then further cycled at room temperature. As shown in FIG. 12, 100% self-discharge was observed from the control cells of Comparative Example 1 (1220). In the presence of lithium oxide ceramic coating on the graphite anode, cell self-discharge was reduced to 91% (1200).

Example 5

This example describes the fabrication and testing of electrochemical cells comprising a lithium oxide-coated graphite anode and a lithium oxide-coated LFP cathode.

A 2 μm layer of lithium oxide was vacuum deposited on graphite electrodes and on LFP electrodes. The cells using oxide-coated graphite and oxide-coated LFP were built in the same manner as in Example 1 and cycled at room temperature for 5 cycles. The fully charged cells were then stored at 60° C. for a week and then further cycled at room temperature. As shown in FIG. 13, 100% self-discharge was observed from the control cells of Comparative Example 1 (1320). In the presence of lithium oxide ceramic coating on both the graphite and LFP electrodes, cell self-discharge was reduced to 55% (1300).

Example 6

This example describes the fabrication and testing of electrochemical cells comprising a lithium oxide-coated anode and a lithium oxide-coated NMC cathode.

A 2 μm layer of lithium oxide was vacuum deposited on graphite electrodes and on NMC electrodes. The cells using oxide-coated graphite and oxide-coated NMC were built in the same manner as in Example 1. Charge and discharge cycling was performed at standard C/8 (3.3 mA) and C/5 rates (5.2 mA), respectively, with a charge cutoff voltage of 4.2 V and a discharge cutoff voltage of 3.2 V. The cells were cycled at room temperature for 5 cycles. The fully charged cells were stored at 60° C. for a week and then further cycled at room temperature. Control cells with regular graphite and NMC electrodes were built and cycled/stored the same way. As shown in FIG. 14, 41% self-discharge was observed from the control cells (1420). In the presence of lithium oxide ceramic coating on both graphite and NMC, cell self-discharge was reduced to 30% (1400).

Example 7

This example describes the fabrication and testing of electrochemical cells comprising an oxysulfide-coated LFP cathode.

A 1 μm layer of electron-beamed oxysulfide ceramic was coated on LFP electrodes as the protective Li-ion conducting ceramic. FIG. 15 shows improved discharge capacity fade rate in the cells containing oxysulfide-coated LFP relative to the control cells with uncoated LFP. Furthermore, from FIG. 15, it can be seen that a 1 μm oxysulfide coating (1500) improved the capacity fade rate more than those containing a 0.5 μm oxysulfide coating (1520) or those not containing a coating (1540).

Example 8

This example describes the fabrication and testing of electrochemical cells comprising an oxysulfide-coated LFP cathode.

A 1 μm layer of electron-beamed oxysulfide ceramic was coated on LFP electrodes as the protective Li-ion conducting ceramic. The cells were built in the same manner and cycled at room temperature for 5 cycles. The fully charged cells were stored at 60° C. for a week and then further cycled at room temperature. The control cells with regular graphite and LFP electrodes were built and cycled/stored the same way. As shown in FIG. 16, 100% self-discharge was observed from the control cells (1620). In the presence of a 1 μm lithium oxysulfide ceramic coating on LFP, cell self-discharge was reduced to 78% (1600).

Example 9

This example describes the fabrication and testing of electrochemical cells comprising an oxysulfide-coated graphite anode.

A 1 μm layer of electron-beamed lithium oxysulfide was vacuum deposited on graphite electrodes. The cells were built in the same manner and cycled at room temperature for 5 cycles. The fully charged cells were stored at 60° C. for a week and then further cycled at room temperature. The control cells with regular graphite and LFP electrodes were built and cycled/stored the same way. As shown in FIG. 17, 100% self-discharge was observed from the control cells (1720). In the presence of lithium oxysulfide ceramic coating on graphite, cell self-discharge was reduced to 84% (1700).

Example 10

This example describes the fabrication and testing of electrochemical cells comprising a graphite anode and an NCM cathode coated with a substantially porous lithium oxide layer.

FIG. 18A shows an SEM image of an uncoated NCM cathode. A 1 μm-thick lithium oxide layer was coated on the NCM cathode by vacuum deposition as a protective lithium-ion-conductive ceramic layer. FIG. 18B shows an SEM image of the NCM cathode with the lithium oxide ceramic coating. From FIG. 18B, it can be seen that the lithium oxide ceramic coating is porous.

The electrochemical cells included an LP30 electrolyte composed of 44.1% dimethyl carbonate, 44.1% ethylene carbonate, 11.8% lithium hexafluorophosphate.

The electrochemical cells were cycled at room temperature for 5 cycles and at 50° C. starting from the $6^{th}$ cycle. FIG. 19 shows improved discharge capacity fade rate in the electrochemical cells comprising the lithium-oxide-coated NCM cathode (1900) relative to control electrochemical cells with the uncoated NCM cathode (1910).

FIGS. 20A-20B show EDS spectra and SEM images (inset) of the graphite anode from an electrochemical cell with an uncoated NCM electrode after 179 cycles (FIG. 20A) and an electrochemical cell with a lithium-oxide-coated NCM electrode after 191 cycles (FIG. 20B). From the EDS spectra in FIGS. 20A-20B, it can be seen that EDS detected Mn on the graphite anode of the cell with the uncoated NCM electrode but not on the graphite anode of the cell with the lithium-oxide-coated NCM electrode. This result suggests that the porous lithium oxide coating on the NCM cathode inhibited Mn corrosion from the NCM cathode and its subsequent reduction on the graphite anode. This may also have improved the capacity fade rate of the electrochemical cell with the lithium-oxide-coated NCM cathode.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell, comprising:
    a first electrode, wherein the first electrode is a lithium intercalation electrode, and wherein the first electrode comprises:
        a layer comprising a first electroactive material, wherein the first electroactive material is a lithium intercalation compound; and
        an inorganic lithium-ion-conductive layer disposed on a surface of the layer comprising the first electroactive material, wherein the inorganic lithium-ion-conductive layer has a porosity of at least 1% by volume and less than 30% by volume, wherein the inorganic lithium-ion-conductive layer comprises an amorphous inorganic material, wherein the inorganic lithium-ion conductive layer is integrated with the first electroactive material, and wherein the inorganic lithium-ion-conductive layer comprises columnar particles;
    a liquid electrolyte, wherein the liquid electrolyte is an organic electrolyte; and
    a second electrode,
    wherein the inorganic lithium-ion-conductive layer is configured to substantially inhibit transport of a species between the first electrode and the second electrode, and wherein the species comprises a species decomposed from the first electrode and/or a species decomposed from the electrolyte.

2. A method of fabricating an electrochemical cell, comprising:
    depositing an inorganic lithium-ion-conductive layer on a layer comprising a first electroactive material to form a first electrode, wherein the first electroactive material is a lithium intercalation compound, wherein the inorganic lithium-ion-conductive layer has a porosity of at least 1% by volume and less than 30% by volume, wherein the inorganic lithium-ion-conductive layer comprises an amorphous inorganic material, wherein the inorganic lithium-ion conductive layer is integrated with the first electroactive material, and wherein the inorganic lithium-ion-conductive layer comprises columnar particles; and
    assembling the first electrode with a liquid electrolyte and a second electrode,
    wherein the liquid electrolyte is an organic electrolyte, wherein the inorganic lithium-ion-conductive layer is configured to substantially inhibit transport of a species between the first electrode and the second electrode, and wherein the species comprises a species decomposed from the first electrode and/or a species decomposed from the electrolyte.

3. The electrochemical cell of claim 1, wherein at least a portion of the first electroactive material is in direct contact with the liquid electrolyte.

4. The method of claim 2, wherein at least a portion of the first electroactive material is in direct contact with the liquid electrolyte.

5. The electrochemical cell of claim 1, wherein:
the inorganic lithium-ion-conductive layer comprises lithium; and
at least a portion of the first electrode is in contact with the electrolyte.

6. A method, comprising:
cycling the electrochemical cell of claim 1, wherein the inorganic lithium-ion-conductive layer comprises lithium; and
substantially inhibiting the species decomposed from the first electrode and/or the species decomposed from the electrolyte from residing at the second electrode.

7. The electrochemical cell of claim 1, wherein the inorganic lithium-ion-conductive layer has a thickness of at least 0.1 microns and at most 10 microns.

8. The electrochemical cell of claim 1, wherein the layer comprising the first electroactive material comprises a plurality of particles of the first electroactive material.

9. The electrochemical cell of claim 8, wherein at least a portion of the plurality of particles of the first electroactive material have a coating.

10. The electrochemical cell of claim 1, wherein the inorganic lithium-ion-conductive layer comprises a ceramic material.

11. The electrochemical cell of claim 10, wherein the ceramic material comprises lithium oxide, lithium nitride, lithium oxysulfide, $Li_{10}GeP_2S_{12}$, and/or $Li_7La_3Zr_2O_{12}$.

12. The electrochemical cell of claim 1, wherein the inorganic lithium-ion-conductive layer has a surface roughness Rz of between 10 nm and 20 μm.

13. The electrochemical cell of claim 8, wherein the plurality of particles of the layer comprising the first electroactive material has a mean maximum cross-sectional dimension of between 1 nm and 15 μm.

14. The electrochemical cell of claim 1, wherein the layer comprising the first electroactive material has a porosity at least 10% by volume and less than 70% by volume.

15. The electrochemical cell of claim 1, wherein the first electrode is a cathode.

16. The electrochemical cell of claim 1, wherein the first electroactive material is a layered oxide, a transition metal polyanion oxide, and/or a spinel.

17. The electrochemical cell of claim 1, wherein the first electroactive material is lithium titanate, lithium cobalt oxide, lithium iron phosphate, lithium nickel oxide, lithium manganese oxide, lithium nickel cobalt aluminum oxide, and/or lithium nickel cobalt manganese oxide.

18. The electrochemical cell of claim 1, wherein the porosity of the inorganic lithium-ion-conductive layer is greater than or equal to 10% by volume and less than 30% by volume.

19. The electrochemical cell of claim 1, wherein the electrochemical cell further comprises a separator.

20. The electrochemical cell of claim 1, wherein the inorganic lithium-ion-conductive layer is a unitary material.

21. The electrochemical cell of claim 1, wherein the porosity of the inorganic lithium-ion-conductive layer is less than 5% by volume.

* * * * *